US010084611B2

(12) United States Patent
Hersche et al.

(10) Patent No.: US 10,084,611 B2
(45) Date of Patent: Sep. 25, 2018

(54) PROGRAMMABLE SYMBOL ANIMATION PRE-PROCESSOR FOR BUILDING AUTOMATION GRAPHICS

(71) Applicant: Siemens Schweiz AG, Zurich (CH)

(72) Inventors: Andreas Hersche, Island Lake, IL (US); James K. Han, Long Grove, IL (US); Patrick Stirnemann, Besenburen (CH)

(73) Assignee: SIEMENS SCHWEIZ AG, Zürich (CH)

( * ) Notice: Subject to any disclaimer, the term of this patent is extended or adjusted under 35 U.S.C. 154(b) by 385 days.

(21) Appl. No.: 14/866,077

(22) Filed: Sep. 25, 2015

(65) Prior Publication Data

US 2017/0090680 A1   Mar. 30, 2017

(51) Int. Cl.
| | |
|---|---|
| G06F 3/0481 | (2013.01) |
| G05B 23/02 | (2006.01) |
| G06T 13/00 | (2011.01) |
| H04L 12/28 | (2006.01) |
| G09B 29/00 | (2006.01) |

(52) U.S. Cl.
CPC ............ *H04L 12/282* (2013.01); *G09B 29/00* (2013.01); *H04L 12/2814* (2013.01)

(58) Field of Classification Search
CPC .... G06F 3/0481; G06T 13/00; G05B 23/0272
USPC ....................................................... 715/736
See application file for complete search history.

(56) References Cited

U.S. PATENT DOCUMENTS

| | | | | |
|---|---|---|---|---|
| 6,353,437 B1 * | 3/2002 | Gagne | ..................... | G06T 13/00 345/473 |
| 6,587,556 B1 * | 7/2003 | Judkins | ............... | H04M 3/5233 379/219 |
| 7,380,206 B1 * | 5/2008 | Usuda | .................... | H04H 20/28 348/E5.104 |
| 7,688,323 B2 * | 3/2010 | Ferguson | ................ | G06T 13/00 345/473 |
| 7,720,779 B1 * | 5/2010 | Perry | ..................... | G06N 7/005 706/45 |
| 7,825,940 B1 * | 11/2010 | Vieilly | .................... | G06T 19/20 345/419 |
| 8,130,226 B2 * | 3/2012 | Brunner | .................. | G06T 15/00 345/473 |
| 8,312,384 B2 * | 11/2012 | Gibson | .................. | G05B 15/02 715/771 |

(Continued)

*Primary Examiner* — Daeho D Song

(57) ABSTRACT

Management systems, methods and mediums are provided for displaying graphics using a programmable symbol animation pre-processor. One method includes identifying a symbol associated with a building graphic, identifying a symbol property to be animated, and determining whether the symbol property is associated with a script. When it is, identifying a plurality of different data points referenced in the script where each data point corresponds to the same device or a respective device in the building. The method identifies a respective value for each identified data point as received from a management system operably connected to each of the plurality of devices, identifies an operation in the script that corresponds to an evaluation of the values of the identified data points, generates a first evaluation result based on the operation, and displays a graphical representation of the symbol based on the first evaluation result and in association with the building graphic.

19 Claims, 18 Drawing Sheets

(56) References Cited

U.S. PATENT DOCUMENTS

| | | | | |
|---|---|---|---|---|
| 8,448,076 B2* | 5/2013 | Hammack | .......... | G05B 19/0426 |
| | | | | 715/763 |
| 8,707,352 B1* | 4/2014 | Crespo | .................... | G06T 13/80 |
| | | | | 725/32 |
| 8,881,039 B2* | 11/2014 | Hammack | ............. | G06T 3/0012 |
| | | | | 715/764 |
| 8,982,132 B2* | 3/2015 | Blas, Jr. | ................... | G06T 13/00 |
| | | | | 345/427 |
| 9,007,479 B2* | 4/2015 | Tanaka | ................... | H04N 9/735 |
| | | | | 348/221.1 |
| 9,584,336 B2* | 2/2017 | Dunn | .................... | H04L 12/283 |
| 2003/0056151 A1* | 3/2003 | Makiyama | .......... | G06F 11/3604 |
| | | | | 714/38.1 |
| 2004/0001106 A1* | 1/2004 | Deutscher | ......... | G06F 17/30017 |
| | | | | 715/838 |
| 2004/0036635 A1* | 2/2004 | Kimura | ................... | H03M 7/40 |
| | | | | 341/107 |
| 2004/0085311 A1* | 5/2004 | Lee | ......................... | G06T 17/30 |
| | | | | 345/419 |
| 2007/0043702 A1* | 2/2007 | Lakshminarayanan | ..................... | |
| | | | | G06F 17/30926 |
| 2007/0132779 A1* | 6/2007 | Gilbert | ................... | G06F 9/4488 |
| | | | | 345/619 |
| 2007/0219781 A1* | 9/2007 | Roche | ................. | G06F 17/2785 |
| | | | | 704/9 |
| 2008/0172622 A1* | 7/2008 | Roche | ............... | G06F 17/30654 |
| | | | | 715/762 |
| 2008/0172647 A1* | 7/2008 | Roche | ............... | G06F 17/30392 |
| | | | | 717/100 |
| 2009/0144225 A1* | 6/2009 | Saito | ................... | G06F 17/3002 |
| 2009/0196497 A1* | 8/2009 | Pankratius | .......... | G06F 17/3089 |
| | | | | 382/165 |
| 2009/0216625 A1* | 8/2009 | Erlebacher | ........... | G06Q 10/087 |
| | | | | 704/9 |
| 2009/0296922 A1* | 12/2009 | Smeets | ................... | G06F 21/16 |
| | | | | 380/28 |
| 2011/0265065 A1* | 10/2011 | Kuboki | ................. | G06F 11/008 |
| | | | | 717/131 |
| 2012/0236007 A1* | 9/2012 | Kuroda | ................... | G06T 13/00 |
| | | | | 345/473 |
| 2012/0311046 A1* | 12/2012 | Grigoriev | ............... | H04W 4/12 |
| | | | | 709/206 |
| 2013/0024844 A1* | 1/2013 | Bienkowski | ........ | G06F 11/3688 |
| | | | | 717/125 |
| 2013/0079903 A1* | 3/2013 | Kemmann | ............. | G05B 15/02 |
| | | | | 700/83 |
| 2013/0083035 A1* | 4/2013 | Han | ................... | G05B 23/0272 |
| | | | | 345/473 |
| 2013/0205221 A1* | 8/2013 | Yamada | ............. | G05B 23/0272 |
| | | | | 715/748 |
| 2015/0309813 A1* | 10/2015 | Patel | ........................ | G06F 8/75 |
| | | | | 703/22 |
| 2016/0027198 A1* | 1/2016 | Terry | ..................... | G06F 17/30 |
| | | | | 345/473 |

\* cited by examiner

1514      1502    1508 var ActualTemp = Read("{*}");       1510
                 1516 ↘         1504 ↘
            var SetPointTemp = Read("{SetPoint}");
           1518↘      1506↘              ↙1512
            var Range = Read("{RangeValue}");
                                                1520 var TemperatureDifference = AcutalTemp - SetPointTemp;
            var ColorValue = "#" + "00";  ← 1522
            if(TemperatureDifference >3)  ← 1524
                                                1526
            {{
            var OpacityValue = Math.abs(255*ActualTemp)/Range);
                OpacityValue = Math.round(OpacityValue);  ← 1528
                If (OpacityValue > 255)  ← 1530
                                                              1534
                    OpacityValue = 255;  ← 1532
                    var OpacityHexValue = OpacityValue.toString(16);
                    ColorValue = "#" + OpacityHexValue + "FF0000"; //red
            }}                                                  ↖1536
            if(TemperatureDifference < 3)  ← 1538
                                                1540
            {{
                var OpacityValue = Math.abs((255 * (Range -
            ActualTemp)) / Range);
                    OpacityValue = Math.round(OpacityValue);  ← 1542
                If (OpacityValue > 255)  ← 1544
                                              1548
                    OpacityValue = 255;  ← 1546
                Var OpacityHexValue = OpacityValue.toString(16);
                ColorValue = "#" + OpacityHexValue + "0000FF"; //blue
            }}                                          ↖1550
            result = ColorValue;  ← 1552
``` ns# PROGRAMMABLE SYMBOL ANIMATION PRE-PROCESSOR FOR BUILDING AUTOMATION GRAPHICS

CROSS-REFERENCE TO OTHER APPLICATIONS

This application also shares some subject matter in common with, but is otherwise unrelated to, the following commonly assigned patent application, which is incorporated by reference to the extent permitted by law:

U.S. patent application Ser. No. 13/537,975, filed Jun. 29, 2012, and titled "Graphical Symbol Animation with Evaluations for Building Automation Graphics".

TECHNICAL FIELD

The present disclosure is directed, in general, to management systems and, more particularly, to a programmable symbol animation pre-processor for building automation graphics.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. Similarly, a security system may have intrusion detection, motion sensors, video cameras and alarm actuators dispersed throughout an entire building or campus. Fire safety systems also include widely dispersed devices in the form of smoke alarms, pull stations and controllers. These building automation systems typically have one or more centralized control stations from which system data may be monitored and various aspects of system operation may be controlled and/or monitored.

Building automation systems may include vast numbers of devices and control points that may be communicated with, monitored, and controlled. Historically, management systems used to display and access data for monitoring and controlling operations of the building automation system have been relatively rigid in their user interface architecture. Because building automation systems are by nature unique to the layout and design of the particular building, maneuvering among displays of various elements of a complex, building automation system using a rigid user interface may be difficult and time consuming for building managers. Further, certain management operations of a building automation system may require that time sensitive information be delivered or identifiable in a timely manner.

The U.S. patent application Ser. No. 13/537,975, filed Jun. 29, 2012, and titled "Graphical Symbol Animation with Evaluations for Building Automation Graphics" (the "'975 application") discloses a novel system having a graphic user interface for displaying and animating graphical symbols for conveying information and alerts regarding a status of devices in one or more buildings. Such system as disclosed in the '975 application supports only one input for an animation of a property of a graphical element in an evaluation, which may be a property of a datapoint, which limits the flexibility for providing symbol animation reflecting information and alerts regarding the status of building devices.

There is a need, therefore, for an improved intuitive interface that allows for information to be delivered or identifiable in a timely manner.

SUMMARY OF THE DISCLOSURE

Various disclosed embodiments relate to systems and methods for displaying graphical symbol animation with evaluations for building automation graphics using a programmable symbol animation pre-processor to enable multi-data points from the same or respective building devices to be employed in the symbol animation to reflect information and alerts regarding the status of multiple building device data points.

Various embodiments include management systems, methods, and mediums. One method, which may be implemented in a data processing system for displaying graphics, includes identifying a symbol associated with a building graphic, identifying a property of the symbol to be animated, and determining whether the identified symbol property is associated with a script. In response to determining that the identified symbol property is associated with a script, the method includes identifying a plurality of different data points referenced in the script where each data point corresponds to a same one or a respective one of a plurality of devices in a building represented by the building graphic. The method further includes identifying a respective value for each identified data point where each value received from a management system operably connected to each of the plurality of devices, identifying an operation in the script that corresponds to an evaluation of the values of the identified data points, generating a first evaluation result based on the operation, and displaying a graphical representation of the symbol based on the first evaluation result and in association with the building graphic.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 15 illustrates an exemplary expression code script that may be received by the evaluation editor menu in FIG. 14, where the expression code script references two or more data points associated with one or more building devices;

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure provide display and animation of graphical symbols for conveying information and alerts regarding a status of devices in one or more buildings. Various embodiments provide substitutions for the graphical symbols to provide different types of information about a same device. Various embodiments include different types of evaluations for presenting information about devices. In addition, embodiments described herein provide displaying graphical symbol animation with evaluations for building automation graphics using a programmable symbol animation pre-processor to enable multi-data points from the same or respective building devices to be employed in the symbol animation to reflect information and alerts regarding the status of multiple building device data points.

Figure 1:
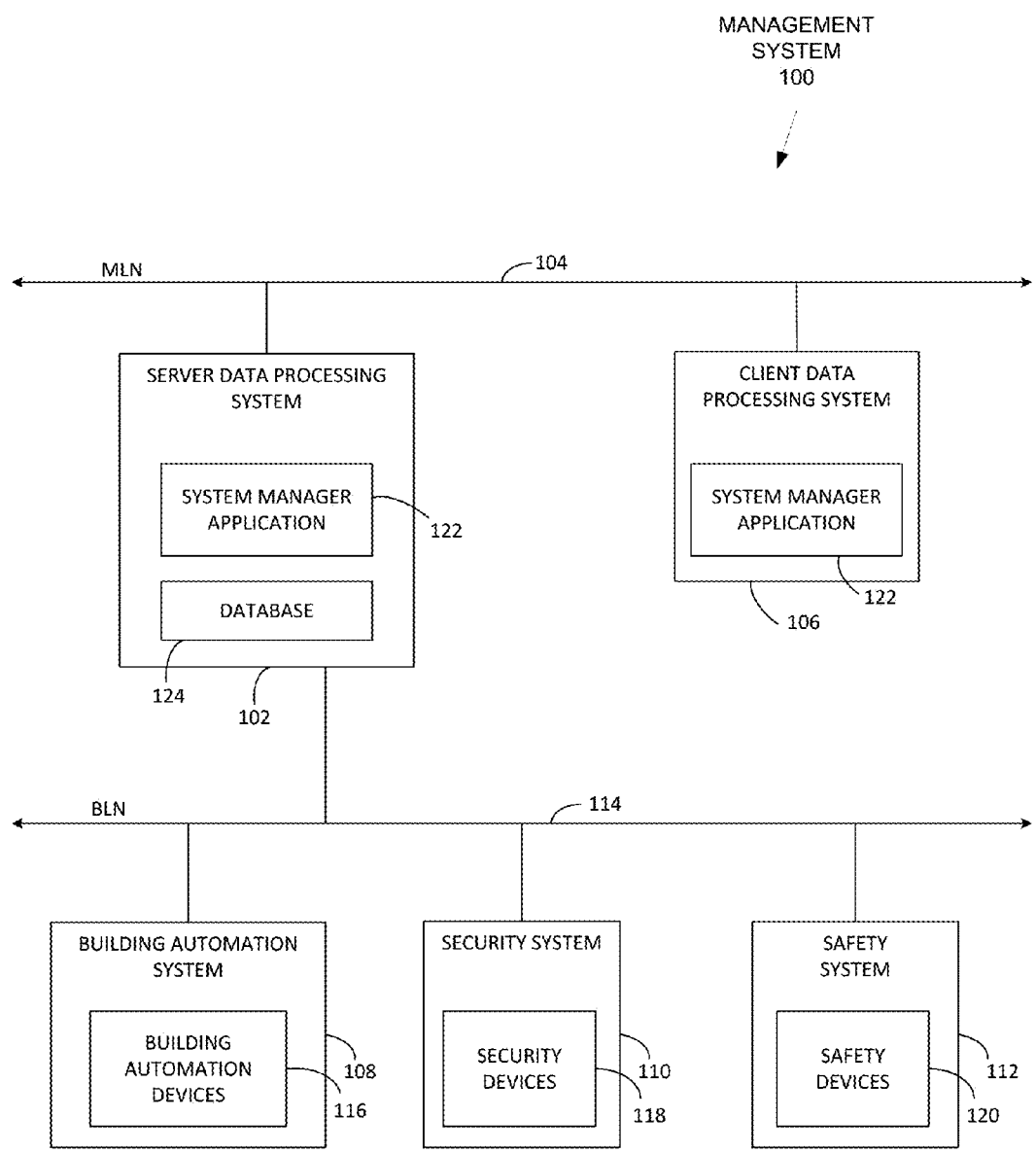
FIG. 1 illustrates a block diagram of a management system in which various embodiments of the present disclosure are implemented.

FIG. 1 illustrates a block diagram of management system 100 in which various embodiments of the present disclosure are implemented. In this illustrative embodiment, the management system 100 includes a server data processing system 102 connected, via a management level network (MLN) 104 to a client data processing system 106. The MLN 104 is a medium used to provide communication links between various data processing systems and other devices in the management system 100. MLN 104 may include any number of suitable connections, such as wired, wireless, or fiber optic links. MLN 104 may be implemented as a number of different types of networks, such as, for example, the internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, server data processing system 102 is operably connected to building automation system (BAS) 108, security system 110, and safety system 112 via building level network (BLN) 114. The BAS 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the BAS 108 includes building automation devices 116, the security system 110 includes security devices 118, and the safety system 112 includes safety devices 120. In some embodiments, the BAS 108 may encompass the security system devices 118 and safety system devices 120. The devices 116-120 may be located inside or in proximity to one or more buildings managed using management system 100. The devices 116-120 are configured to provide, monitor, and/or control functions of the BAS 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, control valves, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the BAS 108, the security system 110, the safety system 112, and/or the server data processing system 102. One or more of the devices 116-120 may also be connected via one or more field level networks (FLN) to a field panel or field controller for monitoring and controlling the respective field devices within a room, floor or other space of a building. For example, devices in the devices 116-120 may send and receive information to and from other devices in the devices 116-120 using one or more FLNs present in management system 100.

Various embodiments of the present disclosure are implemented in the management system 100. The management system 100 allows for systems and devices located throughout one or more buildings to be managed, monitored, and controlled from a single point and in a uniform manner. For example, a system manager application 122 may be installed on one or more workstations, such as server data processing system 102, client data processing system 106, and/or other devices connected via MLN 104. The system manager application 122 is a collection of software and associated data files that provides a user-modifiable and intuitive graphical user interface for allowing a user to monitor, review and control various points and devices in the management system 100. The system manager application 122 may include, for example, without limitation, executable files, user-layout-definition files, graphics control modules, an infrastructure interface, and/or a number of software extensions. In some embodiments, system manager application 122 may be an application framework as described in U.S. patent application Ser. No. 13/609,364, titled "Management System Using Function Abstraction for Output Generation" that is improved to employ the aspects of the present invention as described herein.

The server data processing system 102 includes a database 124 that stores information about the devices 116-120 within the management system 100. The database 124 includes one or more data models of data points, devices, and other objects in the management system 100. For example, the database 124 may store values for devices in the BAS 108 (e.g., temperature, alarm status, humidity). These values may be referred to as a point or data point. As referenced herein, a "point" or "data point" may be (i) any physical input or output to or from a respective controller, field device, sensor or actuator (i.e., devices 116, 118 or 120), or (ii) any virtual point associated with a control application or logic object within a field controller or field panel (or other devices 116-120) of the systems 108-112 that is measured, monitored or controlled. The database 124 may also store static information, such as model numbers, device types, and/or building and room-installation location information about devices in the management system 100. The database 124 may also store graphical models of one or more buildings managed by the management system 100. For example, the graphical models may include layouts and schematics of one or more rooms, floors and buildings managed by the management system 100.

In these illustrative embodiments, objects in the management system 100 (also referenced herein as "system objects", "building device objects", "graphic or symbol objects" or "data objects") include anything that creates, processes or stores information regarding data points, such as physical devices (BAS controllers, field panels, sensors, actuators, cameras, etc.), and maintains data files, such as control schedules, trend reports, calendars, and the like.

In various embodiments, the database 124 includes hierarchy definitions that identify relationships between objects in the system. For example, a hierarchy may include a folder for a "floor" in a building with multiple child folders in the form of "rooms". Each "room" object, in turn, may have several child objects, such as "ventilation damper", "smoke detector", and "temperature sensor". Such hierarchy definitions among objects may employ conventional BACnet structures or may take other forms. It will be appreciated that the use of hierarchical files in the management system 100 allows for technicians to define nearly any desirable hierarchy, the result of which is stored as one of the defined hierarchical files, as discussed further below. The database 124 stores files identifying different versions of hierarchies between the objects of the system, including those system or building device objects representative of the devices 116-120 (e.g., system or building device objects 250A-250N in FIG. 2).

The system manager application 122 may further include software extensions or services that provide operations of the management system 100. For example, the software extensions may include a print manager, a reporting subsystem, and a status propagation manager. For example, a reporting subsystem implemented on a workstation data processing system (e.g., server data processing system 102 or client data processing system 106) is a system that manages the acquisition of data values from the database 124 for the generation of various reports. Such reports may include, for example, trends for a temperature of a room or the like. In another example, the status propagation manager implemented on a workstation data processing system (e.g., server data processing system 102 or client data processing system 106) propagates alarm status information, among other things, to various other system or data objects in the management system 100. An example of a suitable alarm propagation system is provided in U.S. patent application Ser. No. 12/566,891, filed Sep. 25, 2009, which is assigned to the assignee of the present invention and is incorporated by reference herein to the extent permitted by law.

In various embodiments, system manager application 122 may, via server data processing system 102 or client data processing system 106, implement scheduling functions of the management system 100. The scheduling function is used to control points in the various systems based on a time-based schedule. For example, the scheduling function may be used to command temperature set points based on the time of day and the day of the week within the building automation devices 116.

The server data processing system 102 is connected to the BLN 114 and includes one or more hardware and/or software interfaces for sending and receiving information to and from the devices 116-120 in the BAS 108, the security system 110, and/or the safety system 112. For example, the server data processing system 102 may request and receive data regarding a status of one or more devices in the devices 116-120. The system manager application 122, via server data processing system 102 or client data processing system 106, provides a user with the functionality to monitor real-time information about the status of one or more devices and corresponding objects in the management system 100. The system manager application 122, via server data processing system 102 or client data processing system 106, also provides a user with the functionality to issue commands to control one or more devices and objects in the management system 100. For example, one or more of the devices 116-120 may implement a network protocol for exchanging information within the management system, such as building automation and controls network (BACnet) or local operation network talk (LonTalk) protocols.

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the system manager application 122 may be implemented in different data processing systems in the management system 100. In other examples, embodiments of the management system 100 may not include one or more of the BAS 108, the security system 110, and/or the safety system 112.

Figure 2:
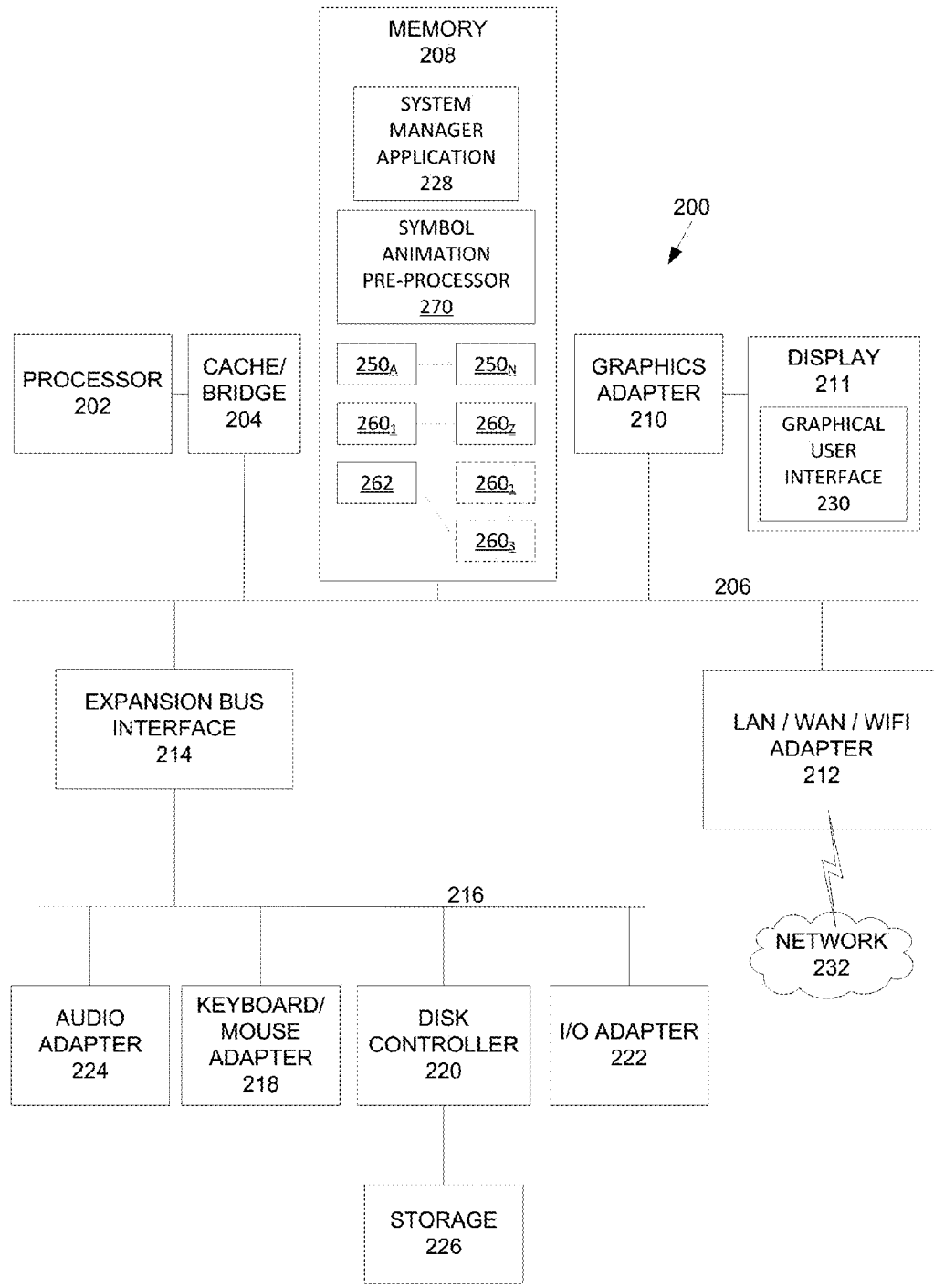
FIG. 2 illustrates a block diagram of a data processing system that may be employed in the management system for implementing various embodiments of the present disclosure.

FIG. 2 depicts a block diagram of a data processing system 200 in which various embodiments are implemented. The data processing system 200 is an example of one implementation of the server data processing system 102 in FIG. 1. The data processing system 200 is also an example of the client data processing system 106.

The data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter or network interface 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 is an input device that provides a connection for a pointing device (not shown), such as a mouse, trackball, trackpointer, etc. In some embodiments, the data processing system 200 may be implemented as a touch screen device, such as, for example, a tablet computer or a touch screen panel that also is an input device for the data processing system 200. In these embodiments, elements of the keyboard/mouse adapter 218 may be implemented in connection with the display 211 to provide an input device capability for the data processing system 200.

In various embodiments of the present disclosure, the data processing system 200 is implemented as an installed workstation with a system manager application 228 installed in the memory 208. The system manager application 228 is an example of one embodiment of system manager application 122 in FIG. 1. For example, the processor 202 executes program code of the system manager application 228 to generate graphical user interface 230 displayed on display 211. In various embodiments of the present disclosure, the graphical user interface 230 includes a display of symbols representing devices inside or in proximity to one or more buildings managed by the management system 100. The graphical user interface 230 provides an interface for a user to view information and alerts for one or more devices, objects, and/or points within the management system 100. The system manager application 228 may retrieve from the database 124 system or building device objects $250_A$-$250_N$ corresponding to devices and/or data points within the management system 100 that are currently represented graphically by symbols or by identifiers via the graphical user interface as further described herein. Also, as further described herein, when generating a building graphic with a symbol, the system manager application 228 may also retrieve symbol objects $260_1$-$260_Z$ from the database 124 and generates instances of the symbol objects that are mapped to a data point of the building device object (e.g., $250_A$) for generating a graphic symbol representing the respective building device and status of the associated data point. In the illustrative embodiment in FIG. 2, the instances of the symbols or symbol objects $260_1$ and $260_3$ are depicted in dashed or broken lines and shown mapped to a building graphic object 262 as reflected by the dashed reference lines between the building graphic 262 and the symbol object instances $260_1$ and $260_3$. In addition, the data processing system 200 may have a symbol animation pre-processor 270 that may be installed in memory 208 for access by the system manager application to selectively pre-process an input to a symbol object instance (e.g., $260_1$) as explained in detail below. The graphical user interface 230 also provides an interface that is customizable to present the information and alerts in an intuitive and user-modifiable manner.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

In addition, although the symbol animation pre-processor 270 is depicted in FIG. 2 as being stored in memory 208 and comprising executable instructions to cause the processor 202 to perform processes described herein (alone or in combination with the system manager application 228), the pre-processor 270 may be implemented in a hardware circuit alone such as in an application-specific integrated circuit (ASIC) with the processor 202 or in an ASIC operatively interfacing with the processor 202.

One of various commercial operating systems, such as a version of Microsoft Windows™, a product of Microsoft Corporation located in Redmond, Wash. may be employed if suitably modified. The operating system may be modified or created in accordance with the present disclosure as described, for example, to implement graphic symbol animations with evaluations for building automation graphics.

LAN/WAN/Wifi adapter 212 (also referenced as a "network interface" herein) may be connected to one or more networks 232 via respective network communication channels of this network interface 212. For example, the network interface may separately connect to the MLN 104 and the BLN 114 as depicted in FIG. 1. As further explained below, each network 232 may be any public or private data processing system network or combination of networks, as known to those of skill in the art, including the Internet. Data processing system 200 may communicate over network 232 to one or more computers, which are also not part of the data processing system 200, but may be implemented, for example, as a separate data processing system 200. When required to interface with different physical networks 232 (e.g., Ethernet or RS-485 or other physical network), a respective network interface 212 is employed in the data processing system to connect to the corresponding physical network 232 (e.g., where MLN 104 and BLN 114 are different physical networks).

Figure 3:
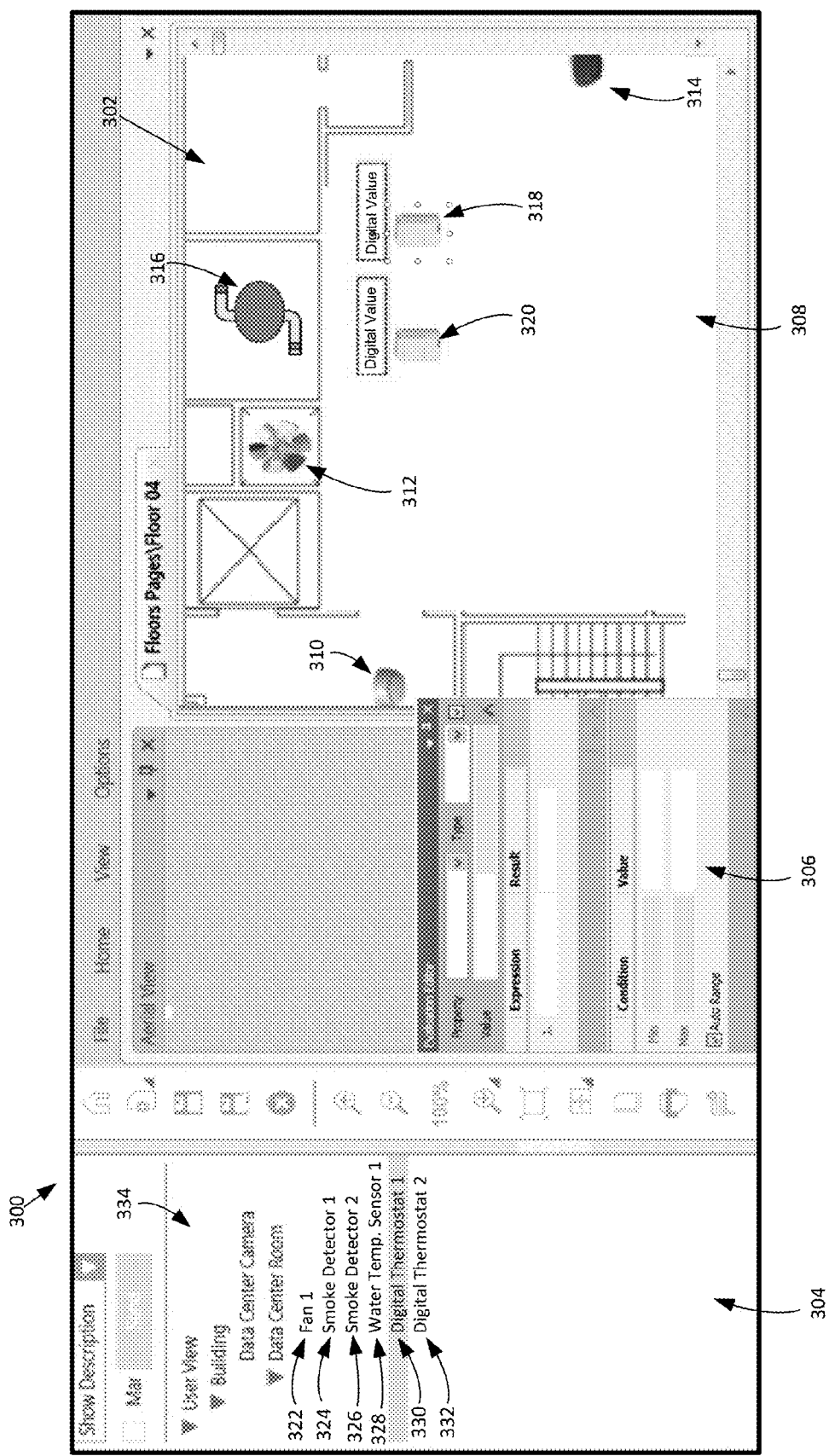
FIG. 3 illustrates a graphical user interface for generating graphical symbol animations for building automation graphics in accordance with disclosed embodiments.

FIG. 3 illustrates a graphical user interface 300 for generating graphical symbol animations for building automation graphics in accordance with disclosed embodiments. In this illustrative embodiment, the graphical user interface 300 is an example of one interface generated by the data processing system 200 and the system manager application 228. In this illustrative embodiment, the graphical user interface 300 comprises a multi-area or multi-pane display window displayed on a display device (e.g., display 211 in FIG. 2). The graphical user interface 300 includes a display of a building graphic 302 and a plurality of associated panes or windows 304-308. In this example, the building graphic 302 is a graphical representation of a floor of a building and is displayed in window 308. The plurality of associated panes or windows 304-308 includes one or more fields for generating and editing different symbol animations for the building graphic 302 displayed in a first or primary pane or window 308.

As used herein, a symbol or graphics symbol (e.g., symbols 310-320) is a reusable graphic image that may represent, for example, a piece of equipment, a device, a sensor, a floor, a component or an entity in association with the building graphic 302. Symbols are stored in a library (e.g., in database 124) and may be used to display values for objects in the management system 100. Symbols may be associated with one or more object types and be bound to object-type properties to create substitutions to provide a dynamic, visual representation of changing values in the management system 100. For example, upon placement of the symbols 310-320 onto a building graphic 302, the data processing system 200 may identify and display system object values in a graphics viewer during a runtime mode. Additionally, the data processing system 200 may include animation of various properties of the symbols to provide information about the system object values in an intuitive and customizable manner.

In various embodiments of the present disclosure, nearly every visual property of a graphic symbol may be used for animation. For example, utilizing the embodiments described herein, a graphics designer may build a library of symbols that have different properties, where each property of the symbol may be animated using different evaluation types, as will be described below. The properties of the symbol may be as simple, such as a collection of one or more lines or a particular shape (e.g., rectangle, triangle, ellipse etc.). The properties of the symbol may be more complex with varying geometries, gradients, and or fill colors. When these properties are grouped together, the properties form a composite symbol that may be used to represent one or more objects or devices in the management system 100. For example, the created graphic symbols may represent a condenser, smoke detectors, security alarms, etc. These created graphic symbols may then be saved as a persistent graphic element template object. Instances of the graphic symbols may be instantiated with either drag and drop of an object identifier in a list in a system browser or directly via a symbol library browser. As a result of the creation of the graphic symbols, a user may then use these symbols but actually does not even need to understand how they were created because each of the properties of the symbol are defined and may be animated via one or more evaluation types, as will be described below. Further, the association of the created graphic symbols as representing type of object or device, the user may not need to understand which symbol to select and may only need to select an object identifier from a system hierarchy.

In the illustrative example shown in FIG. 3, a hierarchical structure 324 of data objects identifiers 322-332 referencing data objects $250_A$-$250_N$ corresponding to devices 116, 118 and 120 within the management system 100 is displayed in the pane or window 304 (also referenced as the "system browser" pane or window) of the graphical user interface 300. For brevity in the discussion, data object identifiers 322-332 are also referenced as objects 322-332 to designate the reference to the corresponding device data objects 250A-250N stored in database 124 and/or memory 208. In this illustrative example, the symbols 310-320 are associated with the objects 322-332. For example, the fan symbol 312 is a graphical representation of the "fan 1" object 322 in the hierarchical structure 334 of system objects in the building graphic 302. For example, the fan symbol 312 is a graphical representation of a fan that is located in a building represented by building graphics 302 and managed by the management system 100. The "fan 1" object 322 is associated with a data point for the fan in the building. For example, the "fan 1" object 322 may be an object for returning a true/false value of whether the fan is presently operating or a value for a speed of the fan in the building managed by the management system 100. In another example, the thermostat symbol 318 is a graphical representation of the "digital thermostat 1" object 330 in the hierarchical structure 334 of system objects in the building graphic 302.

Placement of a symbol onto a graphic creates an "instance" or a copy of all the elements and substitution properties associated with the symbol onto the graphic. When a graphic that has a symbol associated with it is saved, the data processing system 200 may only store the referenced symbol and the associated properties for that symbol. As a result, modifications to the properties of the symbol placed in the graphic only affect the instance of the symbol included in the graphic.

Symbols may also be generic. For example, rather than a small illustration of a device as a symbol, the data processing system 200 may display a simple graphic, such as a shape for the symbol. The use of a generic symbol may be advantageous when, the symbol is linked to an object that has multiple properties, each of the properties with changing values. For example, the data processing system 200 may represent a temperature for a digital thermostat object as a color of the symbol and the state of an HVAC system controlled by the digital thermostat (e.g., cooling state, heating state, fan-only state) as a shape of the symbol. The symbol for the digital thermostat may be modified to represent one or more of the data points for the digital thermostat object. The modification of the symbol may be accomplished, for example, by extending the expression syntax with the use of the question mark in the expression for the data point.

In each instance of a symbol, the properties of the symbol may be substituted such that different instances of the symbol represent different properties. For example, thermostat symbol 318 may be a first instance of a thermostat symbol for the "digital thermostat 1" object 330 while thermostat symbol 320 is a second instance of the thermostat symbol the "digital thermostat 2" object 332. Substitutions allow for definition of what properties of a symbol are visible when the symbol is displayed. A substitution of properties in a symbol may be created by adding brackets into a properties evaluation of a graphic element within a symbol. Each symbol property and some or all of the attributes of the symbol may be substituted in each instance of the symbol. For example, the thermostat symbol 318 may be used to display a temperature property of the "digital thermostat 1" object 330 while thermostat symbol 320 may be used to display a state of an HVAC system controlled by a digital thermostat represented by the "digital thermostat 2" object 332.

In this illustrative example, the data processing system 200 provides an evaluation editor menu 306 to select or edit the properties, evaluation types, expressions, and conditions under which values of the objects 322-332 are displayed and/or animated in the symbols 310-320 displayed in the building graphic 302. As used herein, an evaluation is a type of illustration used to convey a state of a device or value of a data point in one or more intuitive, alerting, or eye-catching manners. For example, evaluation types may be used to provide a user with a way to easily perceive and monitor information about components within or in proximity to buildings managed by management system 100. For example, without limitation, exemplary evaluation types include simple, linear, discrete, multi, and animated.

In various embodiments, the data processing system 200 identifies which one of the evaluation types of a selected symbol is selected by a user through a user input into the evaluation editor menu 306. The data processing system 200 identifies a result of an expression for a data point of an object represented by the selected symbol and maps the expression value (i.e., the result of the expression) to an evaluation value. As used herein, an expression is a mathematical function of the value of a data point. For example, the expression may be just the value of the data point, some offset for the value of the data point, or some manipulation of the data point. The data processing system 200 then displays a graphical representation of the evaluation value based on the selected evaluation type. For example, the simple evaluation type is when the expression value is mapped into the evaluation type as is (i.e., only a data type mapping is done without any conditions). If the thermostat symbol 318, a temperature property of the "digital thermostat 1" object 330, and the simple evaluation type are selected, the data processing system 200 may identify the value of the data point for temperature detected by the digital thermostat represented by the "digital thermostat 1" object 330 as the evaluation value and display that value as the graphical representation of the value for the data point associated with the digital thermostat in the building managed by management system 100. Additional descriptions and examples of evaluation types are discussed below with regard to FIGS. 4-8 below.

The illustration of the graphical user interface 300 in FIG. 3 is intended as an illustrative example of one embodiment of the present disclosure and not meant to imply physical or architectural limitations to the manner in which different illustrative embodiments may be implemented. For example, any number of windows may be present in the graphical user interface 300. In other examples, any number of symbols and/or objects may be present in the building graphic 302.

Figure 4:
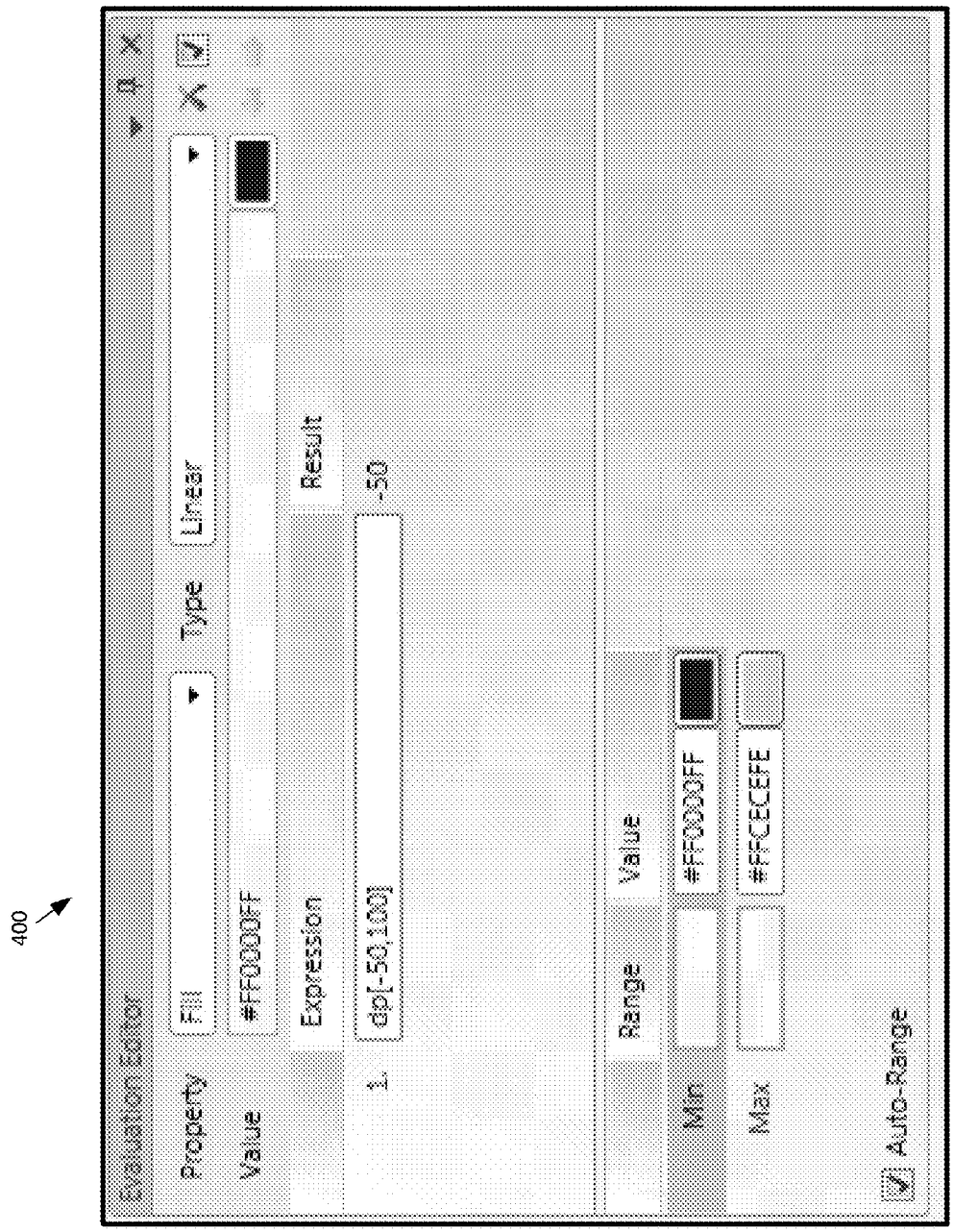
FIG. 4 illustrates an exemplary evaluation editor menu for linear evaluation type in accordance with disclosed embodiments.

FIG. 4 illustrates an exemplary evaluation editor menu 400 for linear evaluation types in accordance with disclosed embodiments. In this illustrative embodiment, evaluation editor menu 400 is an example of one implementation of the evaluation editor menu 306 in FIG. 3 where a linear evaluation type has been selected. For example, the data processing system 200 may receive user inputs through the evaluation editor menu 400 to generate and display a linear evaluation type as an animation of a symbol in the building graphic 302.

In this illustrative example, a linear evaluation type and a property to fill a symbol have been selected. For example, the symbol may be a representation of a value for water temperature reported by an object for a water temperature sensor (e.g., water temperature symbol 316 and "water temp. sensor 1" 328 in FIG. 3). In this example, the expression is a range of values for the value from the water temperature sensor from negative 50 to 100 and the result of the expression is negative 50. This minimum value for the expression value is mapped to the minimum evaluation value (#FF0000FF) which is a hexadecimal value representation for the color dark blue. The data processing system 200 then fills the water temperature symbol 316 with the dark blue evaluation value color to reflect that the water temperature is cold.

In this example, the data processing system 200 maps the range of the expression values (e.g., negative 50 to 100) to the range of evaluation values (e.g., #FF0000FF to #FFCECEFE). As a result, as the temperature reported from the water temperature sensor in the building increases, the data processing system 200 maps the value for temperature to colors representing the increase in temperature. For example, at an expression value of 100, the evaluation value may be a light blue color representing normal water temperature. In various embodiments, the data processing system 200 periodically receives values for the temperature data point from the management system 100 and updates the displayed evaluation value based on changes in the values for the temperature data point.

In another example, the auto range for the range of expression values may be disabled. In this example, the range of expression values may be set as a condition in the evaluation editor menu 400. For example, the range of condition values may be set from 10 to 30 and the data processing system 200 will then map the range of condition values to the range of evaluation values where the evaluation value is the dark blue color for any expression values at or below 10 and light blue for any values at or above 30.

In another example, only the minimum or maximum expression value may be specified with the other expression value unspecified. In this example, the corresponding minimum or maximum range condition values may be identified from the expression range. In yet another example, the minimum condition value may be larger than the maximum condition value. In this example, the data processing system 200 maps the lower temperature values to the higher evaluation values and the higher temperature values to the lower evaluation values for an inverse relationship between expression value and evaluation value.

Figure 5:
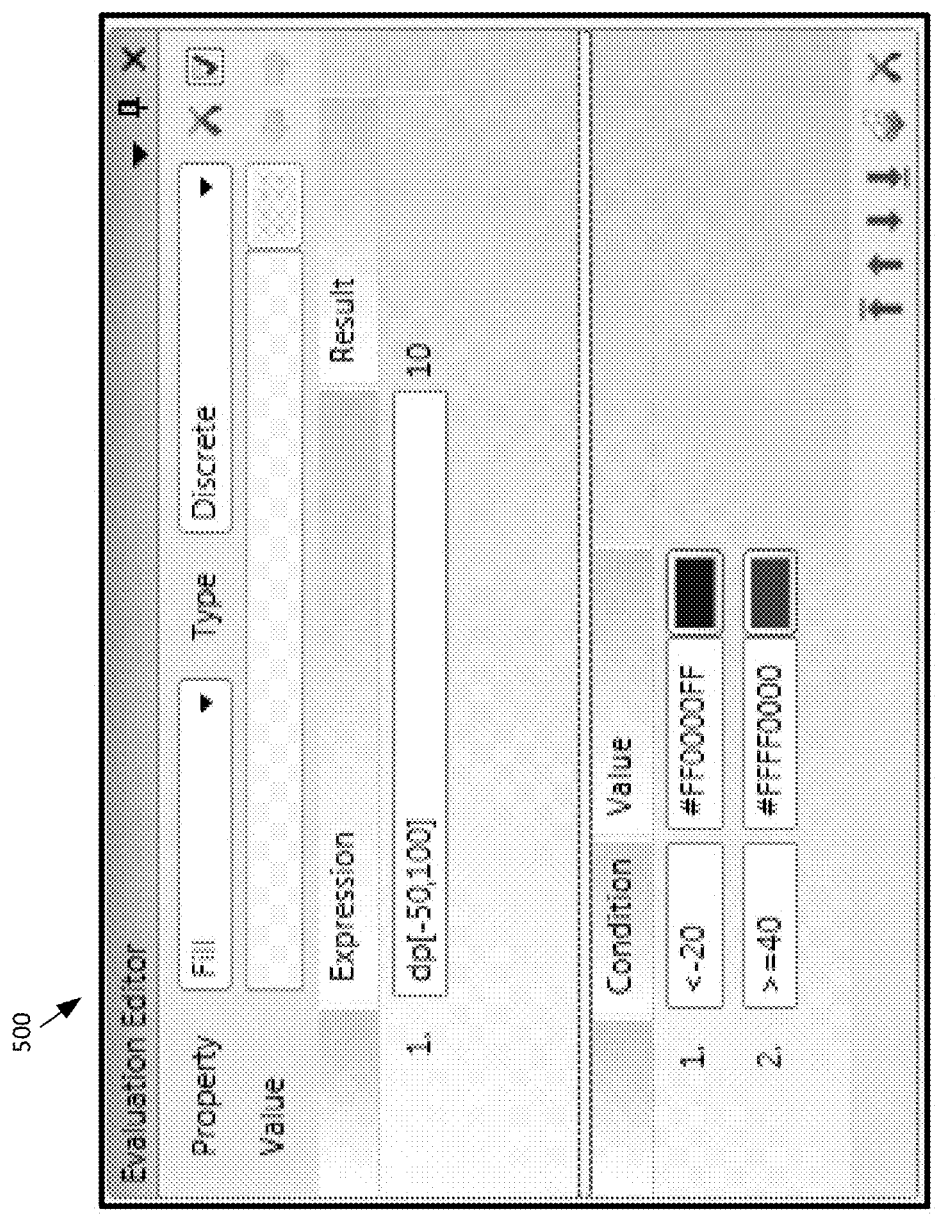
FIG. 5 illustrates an exemplary evaluation editor menu for discrete evaluation type in accordance with disclosed embodiments.

FIG. 5 illustrates an exemplary evaluation editor menu 500 for discrete evaluations type in accordance with disclosed embodiments. In this illustrative embodiment, evaluation editor menu 500 is an example of one implementation of the evaluation editor menu 306 in FIG. 3 where a discrete evaluation type has been selected. For example, the data processing system 200 may receive user inputs through the evaluation editor menu 500 to generate and display a discrete evaluation type as an animation of a symbol in the building graphic 302.

In this illustrative embodiment, the data processing system 200 performs a mapping between expression values and evaluation values similar to the description of the linear evaluation described with regard to FIG. 4 above. However, for the discrete evaluation type, the mapping is not a linear mapping. In the illustrated example, the range of expression values is from negative 50 to 100. However, the condition values are less than negative 20 and greater than or equal to 40. In this example, the data processing system 200 maps the range of expression values that are lower than negative 20 (i.e., negative 50 to less than negative 20) to the specified evaluation value (i.e., #FF0000FF or blue) and the range of expression values that are greater than or equal to 40 (i.e., 40 to 100) to the specified evaluation value (i.e., #FFFF0000 or red). For expression values that are not within one of the mapped ranges, the data processing system 200 associates these expression values with a default evaluation value, for example, a neutral color or possibly no color at all. Thus, for the depicted example where the expression result is 10, the evaluation value is the default evaluation value.

This use of discrete evaluation types may be particularly advantageous where a user desires to be notified when system values reach points on the extreme ends of acceptable values. For example, if the data point is water temperature value received from a water temperature sensor, values greater than or equal to negative 20 and less than 40 may be acceptable. In this scenario, the user may not need to be alerted or have their attention drawn to the symbol representing the water temperature sensor. However, should the water temperature drop below negative 20 or reach 40, in this particular example, the data processing system 200 would change the display of the color for the default evaluation value to that of blue or red indicating that the water temperature may be too cold or too hot, respectively.

Figure 6:
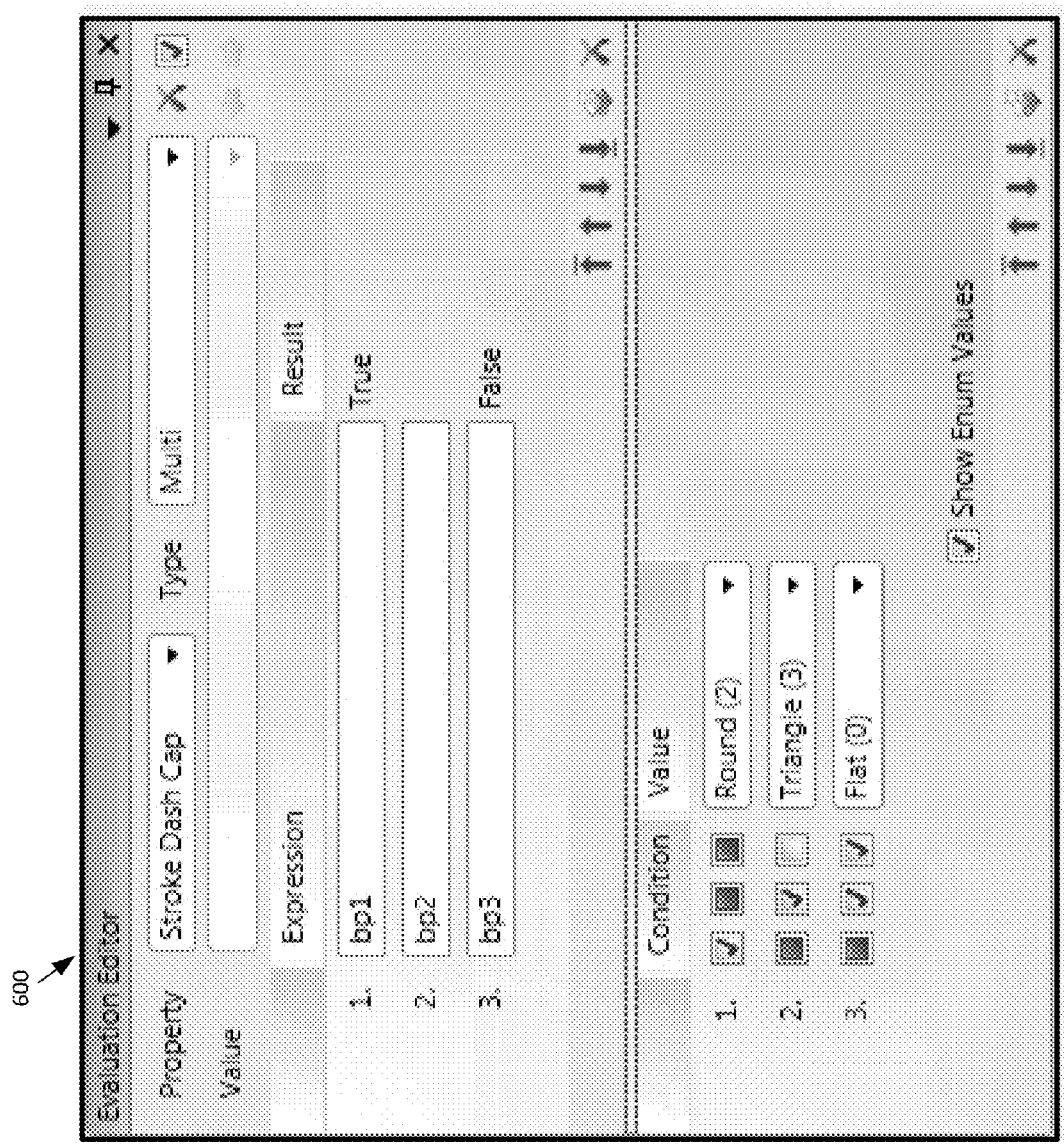
FIG. 6 illustrates an exemplary evaluation editor menu for multi evaluation type in accordance with disclosed embodiments.

FIG. 6 illustrates an exemplary evaluation editor menu for multi evaluation types in accordance with disclosed embodiments. In this illustrative embodiment, evaluation editor menu 600 is an example of one implementation of the evaluation editor menu 306 in FIG. 3 where a multi evaluation type has been selected. For example, the data processing system 200 may receive user inputs through the evaluation editor menu 600 to generate and display a multi evaluation type as an animation of a symbol in the building graphic 302.

In various embodiments, the multi evaluation type is used when the evaluation depends on more than one digital data point. For example, the use of multi evaluation types may be particularly advantageous when more than one condition needs to occur before an alert or notification change is warranted or when a particular result may be achieved through different ways.

In the example illustrated, the expression values include results evaluations of three different data points "bp1"-"bp3." For example, the three different data points may be received from three different sensors. In this example, the evaluation value should be "Round" if "bp1" is true with "bp2" and "bp3" ignored. The evaluation value should be "Triangle" if "bp2" is true and "bp3" is false with "bp1" ignored. The evaluation value should be "Flat" if "bp2" is true and "bp3" is also true with "bp1" ignored. In any other situation, (e.g., "bp1" and "bp2" are false) a default evaluation value will be used. In another example, a fourth condition with all checkboxes set to unspecified could have been added to effectively take the place of the default evaluation value.

Figure 7:
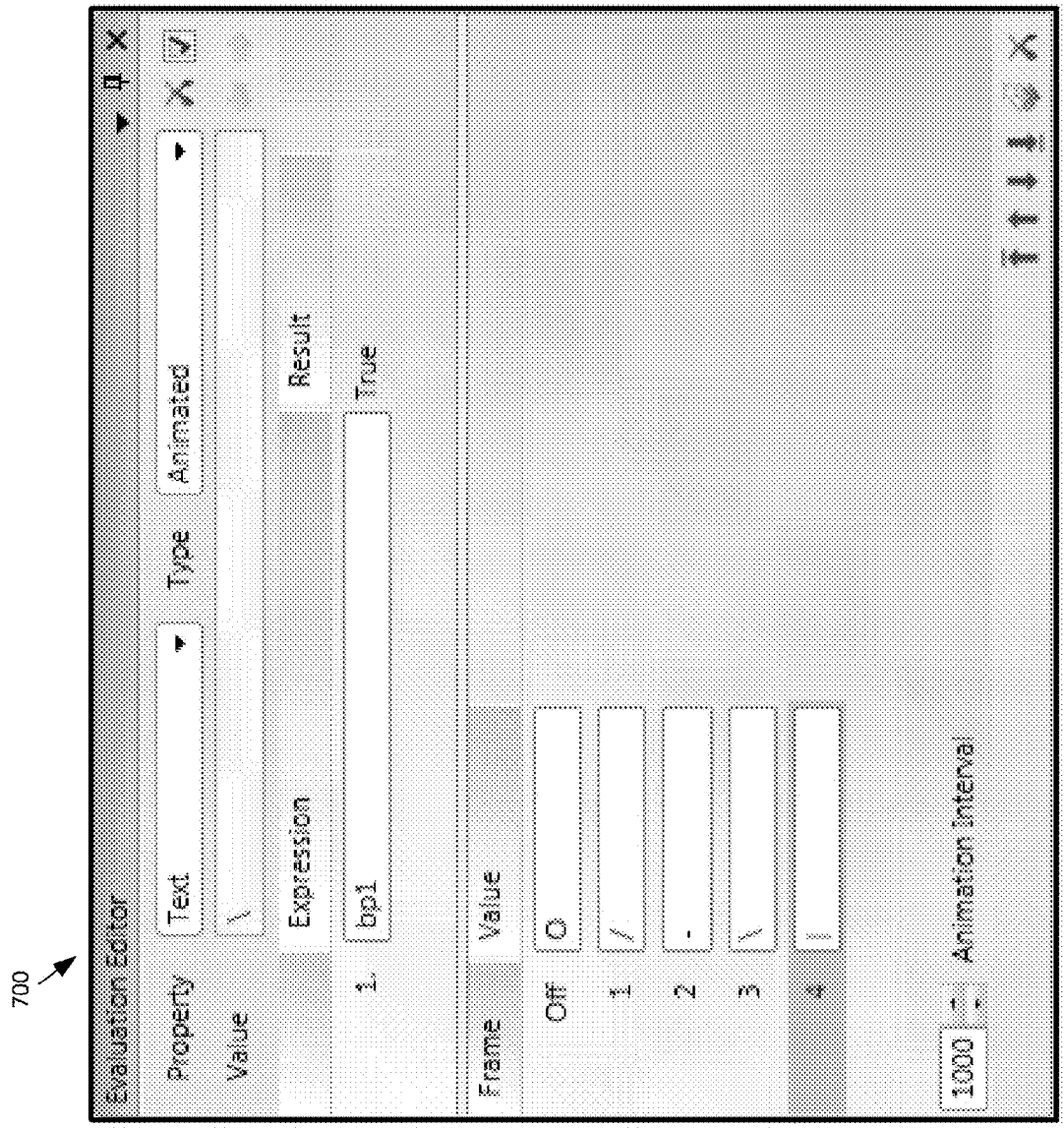
FIG. 7 illustrates an exemplary evaluation editor menu for animated evaluation type in accordance with disclosed embodiments.

FIG. 7 illustrates an exemplary evaluation editor menu for animated evaluation types in accordance with disclosed embodiments. In this illustrative embodiment, evaluation editor menu 700 is an example of one implementation of the evaluation editor menu 306 in FIG. 3 where an animated evaluation type has been selected. For example, the data processing system 200 may receive user inputs through the evaluation editor menu 700 to generate and display an animated evaluation type of a symbol in the building graphic 302.

In various embodiments, the animated evaluation type may be used when the value of the data point is changed with a certain interval. The animation of the evaluation value either is "off" or "on", based on the expression result. If the expression result is 0 or false, then the animation is off Otherwise, the animation is on. This use of the animated evaluation type may be particularly useful to indicate to a user that a particular data point is continuing to be monitored and evaluated. For example, the animation of the evaluation value may indicate that an alarm is continuing to sound rather than had sounded at some point in the past and the display has not yet been updated.

In the illustrated example, when the result of the expression for the value of "bp1" is "false", the data processing system 200 displays the "Off" condition value of "0". When the result of the expression for the value of "bp1" is "true", the data processing system 200 cycles through a display of various text characters to indicate that the result is "true". The animation interval may be set for the length of time (in milliseconds) that each character is displayed.

Figure 8:
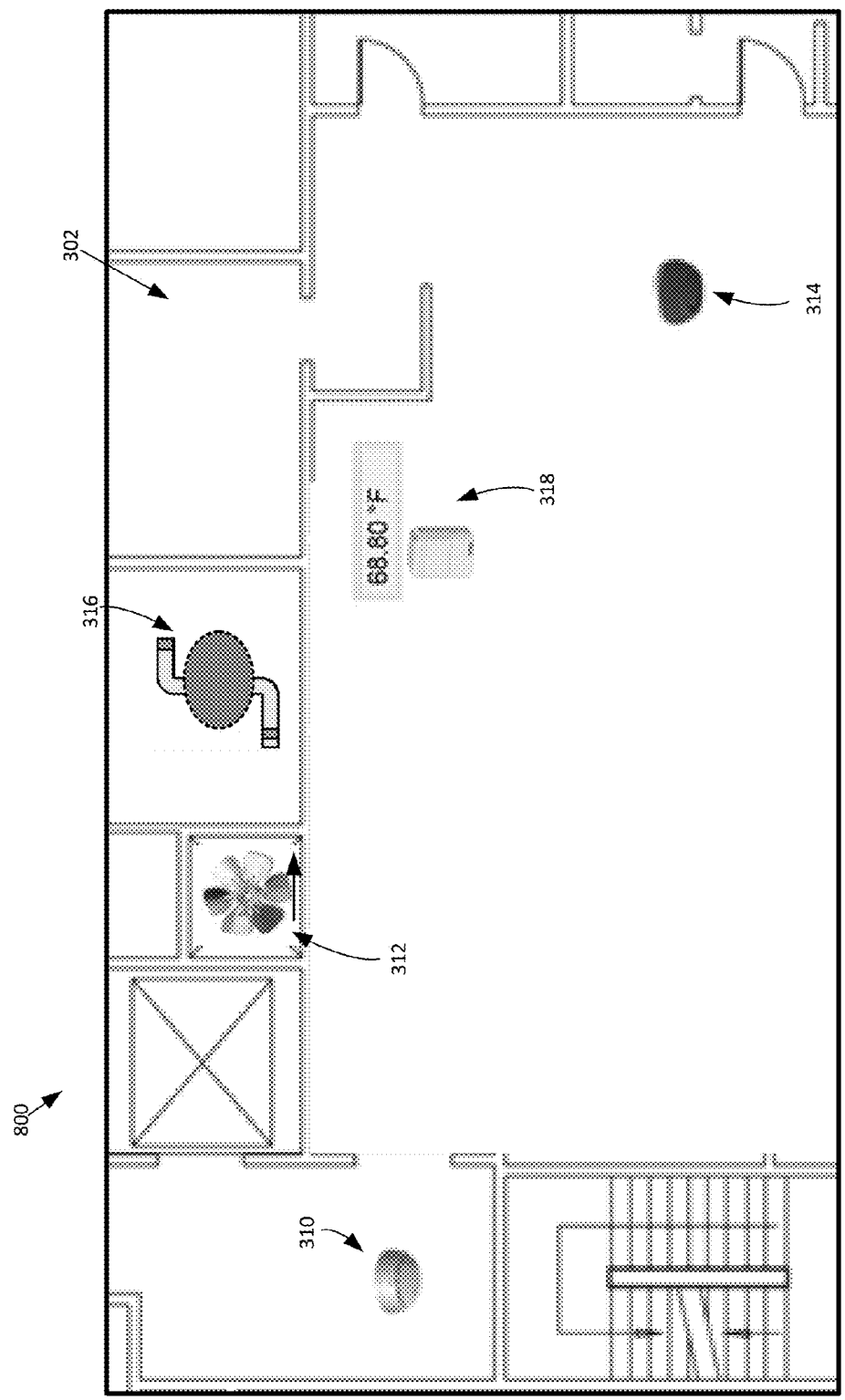
FIG. 8 illustrates an exemplary screen capture of graphical symbol animations with evaluations for building automation graphics in accordance with disclosed embodiments.

FIG. 8 illustrates an exemplary screen capture of graphical symbol animations with evaluations for building automation graphics in accordance with disclosed embodiments.

In this illustrative embodiment, the graphical user interface 800 in FIG. 8 is an example of the graphical user interface 300 in a runtime mode. For example, the graphical user interface 800 is a display generated by the data processing system 200 while the system manager application 228 is in the runtime mode. The runtime mode is an active display mode displaying the building graphic 302 as well as a graphical representation of a state of one or more devices in the building represented by symbols in the building graphic 302. For example, the runtime mode allows a building manager to view and monitor information about system objects on a floor of a building.

In this illustrative example, symbols 310-318 provide an example of different animations for different evaluation types. For example, the smoke detector symbol 314 is red indicating that a smoke detector in a building managed by the management system 100 represented by the smoke detector symbol 314 is in an alarm state, while smoke detector symbol 310 is grey, indicating a normal state. This animation is an example of a discrete evaluation type. For example, an expression result for a data point for the alarm state being true results in a mapping to a red color while an expression result for the data point for the alarm state being false results in a mapping to a grey color or a default evaluation type. In another example, the fan symbol 312 has an arrow in a counter-clockwise direction indicating that a fan represented by the fan symbol 312 is both rotating at a speed greater than a threshold and in a counter-clockwise direction. This animation is an example of a multi evaluation type. For example, the data processing system 200 may identify that a condition where an expression result for a data point for fan speed and an expression result for a data point for direction of fan rotation results in an evaluation value of an arrow pointing to the right to be placed beneath the fan symbol 312.

In yet another example, the color displayed for the water temperature symbol 316 may be an example of a linear or discrete evaluation type. The data processing system 200 may identify the evaluation value to display based on a value of a data point for water temperature received from the management system based on a linear or discrete evaluation type and display the color corresponding to the evaluation value. In another example, the dashes surrounding the colored area of the water temperature symbol 316 is an example of an animated evaluation type. For example, the data processing system 200 may identify that the water temperature sensor is turned on, and values for water temperature are continuing to be received. In this example, the data processing system 200 may cycle through, for example, dashes, crosses, and squares to indicate that the water temperature is continuing to be monitored. If the data processing system 200 were no longer receiving values for the water-temperature data point, the data processing system 200 may instead display constant circles to indicate that the water temperature is not presently monitored. In another example, the digital thermostat symbol 318 is an example of a simple evaluation type. For example, the data processing system 200 may identify that the result of an evaluation including a data point for room temperature is 68.80° F. In this example, the data processing system 200 displays the evaluation value for room temperature as a number in association with the digital thermostat symbol 318.

FIGS. 4-8 are intended as illustrations of elements of various embodiments of the present disclosure and are not meant to imply physical or architectural limitations to the manner in which different illustrative embodiments may be implemented. For example, different types of symbols may be animated, and different properties of the symbol may be animated.

Figure 9:
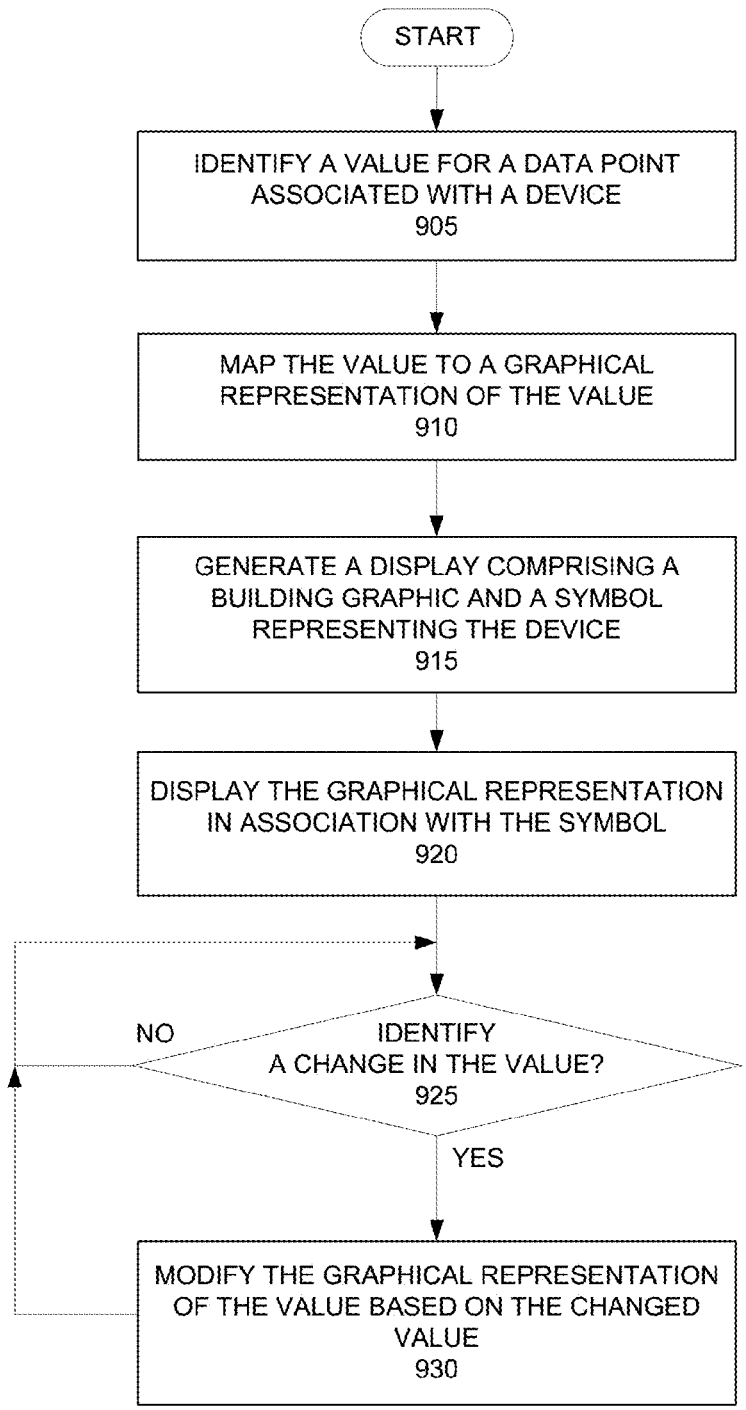
FIG. 9 illustrates a flowchart of a process for displaying a graphical representation of a value for a data point with building automation graphics in accordance with disclosed embodiments.

FIG. 9 illustrates a flowchart of a process for displaying a graphical representation of a value for a data point with building automation graphics in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems to perform such a process.

The process begins with the system identifying a value for a data point associated with a device (step 905). In step 905, the system may identify the value from a management system operably connected to the device. For example, the device may be one of devices 116-120 inside or in proximity to one or more buildings managed by the management system 100. The data point may be, for example, without limitation, a value for an input, output, monitoring state and/or any other data point identifiable about a device.

The system maps the value to a graphical representation of the value (step 910). In step 910, the system may proceed through one or more evaluation types to map the value of the data point to a graphical representation of the value. The graphical representation of the value may be text, a color, a symbol, an animation or any other graphical representation of the value.

The system generates a display comprising a building graphic and a symbol representing the device (step 915). In step 915, the symbol is an instance of an object for the data point. For example, the instance of the symbol may be an illustration of one or more properties of the symbol. A second instance of the symbol may include substations for the one or more properties of the symbol illustrated in the second instance of the symbol.

The system displays the graphical representation in association with the symbol (step 920). In step 920, for example, the system may display the graphical representation of the value above, below, to the left, to the right, on top of, or beneath the symbol. The graphical representation of the value may also be the color of the symbol that the system displays.

The system determines whether a change in the value has been identified (step 925). In step 925, the system monitors the value of the data point and performs the evaluation of the data point to determine whether the graphical representation of the value will change based on a change in the value of the data point. If the system determines that change in the value has not been identified, the system returns to step 925 and continues to monitor for a change in the value.

If the system determines that change in the value has been identified, the system modifies the graphical representation of the value based on the changed value (step 930). In step 930, the system identifies what the graphical representation of the value should be based on the changed value. If the identified graphical representation is different from the currently displayed graphical representation, the system changes the graphical representation displayed to the recently identified graphical representation. On the other hand, if, for example, the change in the value did not result in a change that should be displayed as the graphical representation of the value, the system may not change the graphical representation. The system then returns to step 925 and continues to monitor for a change in the value.

Figure 10:
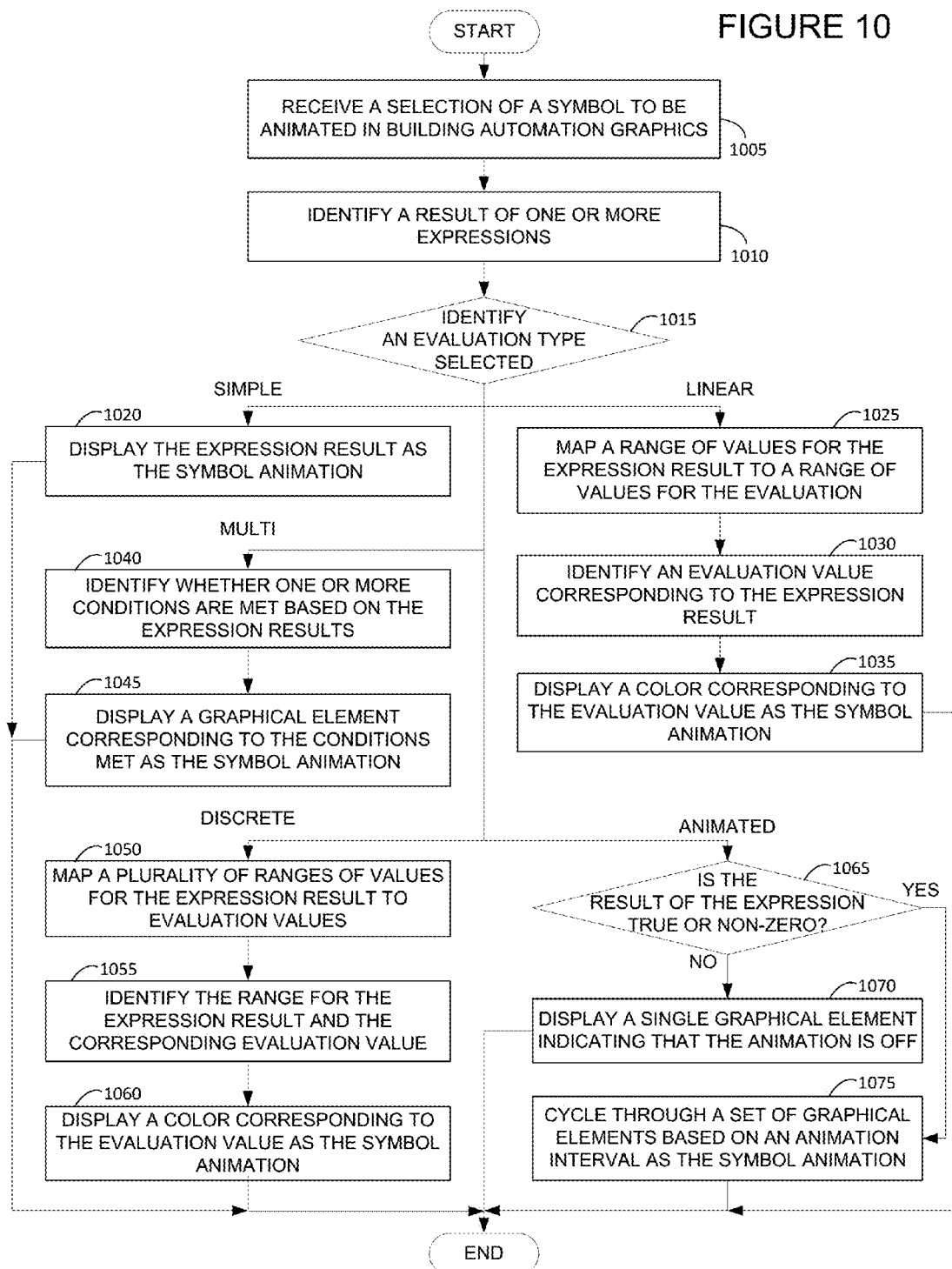
FIG. 10 illustrates a flowchart of a process for displaying symbol animation of a selected evaluation type with building automation graphics in accordance with disclosed embodiments.

FIG. 10 illustrates a flowchart of a process for displaying symbol animation of a selected evaluation type with building automation graphics in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems to perform such a process.

The process begins with the system receiving a selection of a symbol to be animated in building automation graphics (step 1005). The system identifies a result of one or more expressions (step 1010). In step 1010, the expressions are expressions for a value of a data point of a system object represented by the selected symbol. The expressions may be the value for the data point or mathematical functions on the value of the data point input by a user.

The system identifies an evaluation type selected (step 1015). In step 1015, the system may identify the selected evaluation type as one of simple, linear, discrete, multi, and animated. For example, the system may identify the selected evaluation type from a user input in the evaluation editor menu 306 in FIG. 3.

If the system identifies the evaluation type as simple, the system displays the expression result as the symbol animation (step 1020), with the process terminating thereafter. In step 1020, the system may map the result of the expression to the evaluation value and display the graphical representation of the evaluation value as the symbol animation.

Returning to step 1015, if the system identifies the evaluation type as linear, the system maps a range of values for the expression result to a range of values for the evaluation (step 1025). For example, in step 1025, the mapping of expression values to evaluation values may be implemented as described in the discussion of FIG. 4 above.

The system identifies an evaluation value corresponding to the expression result (step 1030). The system displays a color corresponding to the evaluation value as the symbol animation (step 1035), with the process terminating thereafter. For example, in step 1035, the display of the symbol animation may be displayed as illustrated by the water temperature symbol 316 in FIG. 8.

Returning to step 1015, if the system identifies the evaluation type as discrete, the system maps a plurality of ranges of values for the expression result to evaluation values (step 1050). For example, in step 1050, the mapping of expression values to evaluation values may be implemented as described in the discussion of FIG. 5 above.

The system identifies the range for the expression result and the corresponding evaluation value (step 1055). The system displays a color corresponding to the evaluation value as the symbol animation (step 1060), with the process terminating thereafter. For example, in step 1060, the display of the symbol animation may be displayed as illustrated by the water temperature symbol 316 or the smoke detector symbol 314 in FIG. 8.

Returning to step 1015, if the system identifies the evaluation type as multi, the system identifies whether one or more conditions are met based on the expression results (step 1040). For example, in step 1040, the identification of conditions met may be implemented as described in the discussion of FIG. 6 above. The system displays a graphical element corresponding to the conditions that are met as the symbol animation (step 1045), with the process terminating thereafter.

Returning to step 1015, if the system identifies the evaluation type as animated, the system determines whether the result of the expression is true or non-zero (step 1065). If the system determines that the result of the expression is false or zero, the system displays a single graphical element indicating that the animation is off (step 1070), with the process terminating thereafter.

Returning to step 1065, if the system determines that the result of the expression is true or non-zero, the system cycles through a set of graphical elements based on an animation interval as the symbol animation (step 1075), with the process terminating thereafter. For example, in step 1075, the cycling of graphical elements based on the animation interval may be implemented as described in the discussion of FIG. 6 above.

Figure 11:
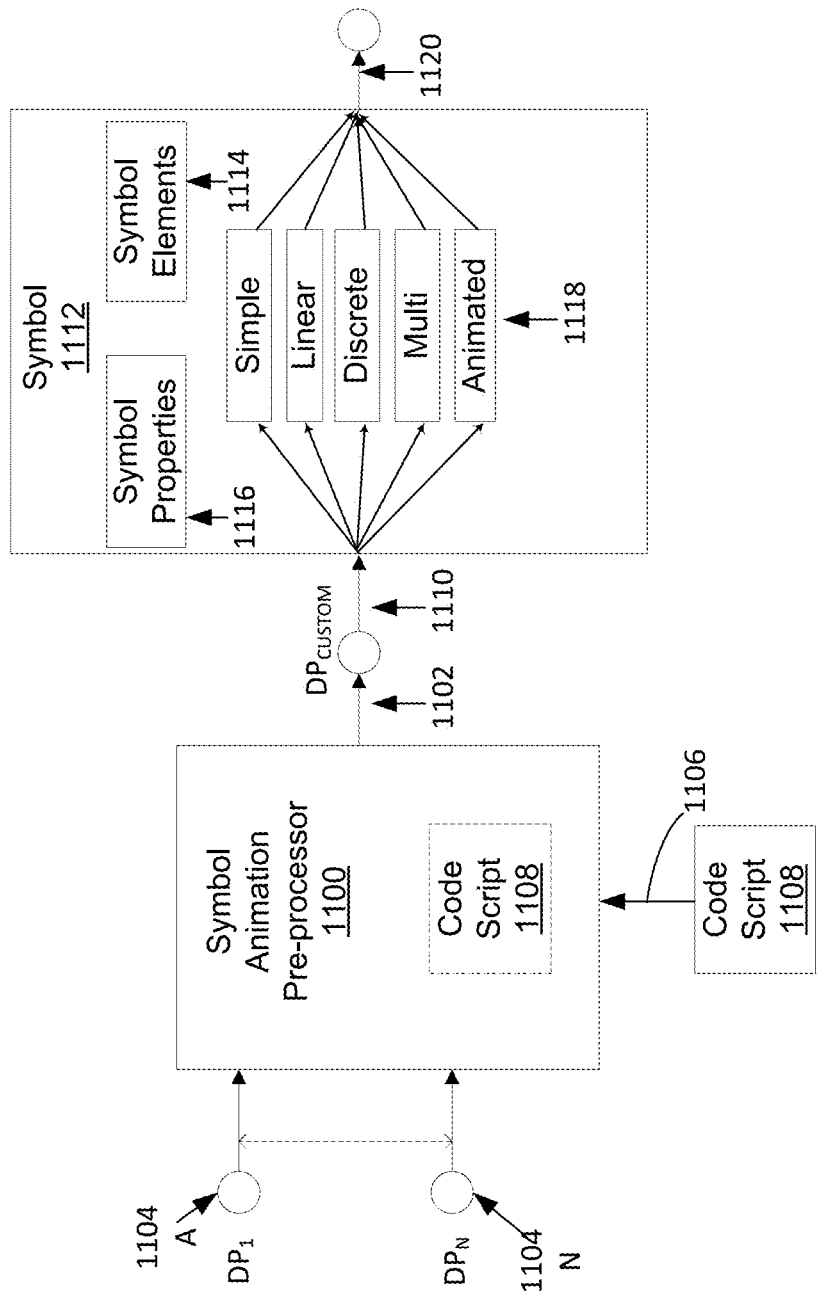
FIG. 11 illustrates a functional block diagram of a user programmable symbol animation pre-processor that may be employed in the data processing system in accordance with disclosed embodiments, where a property of the respective symbol may be selectively animated using the pre-processor.

Turning to FIG. 11, a functional block diagram of a user programmable symbol animation pre-processor 1100 that may be employed in the data processing system 200 in accordance with disclosed embodiments, where an element of a symbol (e.g., 1100) may be selectively animated using the pre-processor 1100. The pre-processor 1100 may be consistent with the pre-processor 270 stored in memory 208 for access by the system manager application 228 and/or processor 202 of the data processing system 200 to perform one or more of the steps of the symbol animation processes/methods and functionality disclosed herein. Alternatively, the pre-processor 270 or 1100 may be implemented in a hardware circuit alone such as ASIC with the processor 202 or in an ASIC operatively interfacing with the processor 202.

As shown in FIG. 11 and described in further detail herein, the symbol animation pre-processor 1100 has an output 1102, one or more configurable data point inputs 1104A-1104N, and a script input 1106 to receive an expression code script 1108 for evaluating the values of the data point inputs 1104A-1104N received from one or more building devices 116, 118, or 120 in accordance with at least one operation identified in the script 1108. The expression code script 1108 is shown in dashed or broken lines within the symbol animation pre-processor 1100 to reflect that the contents of the script 1108 are parsed by the pre-processor 1100 to identify the data points 1104A-110N to be mapped to the inputs 1104A-1104N for evaluation in accordance with the one or more operations identified in the script 1108. The symbol animation pre-processor 1100 is configured to present the evaluation result (also referenced as "$DP_{custom}$" or customized data point in FIG. 11) as the output 1102 to a selectively linked or mapped property input 1110 of a symbol 1112.

Figure 12:
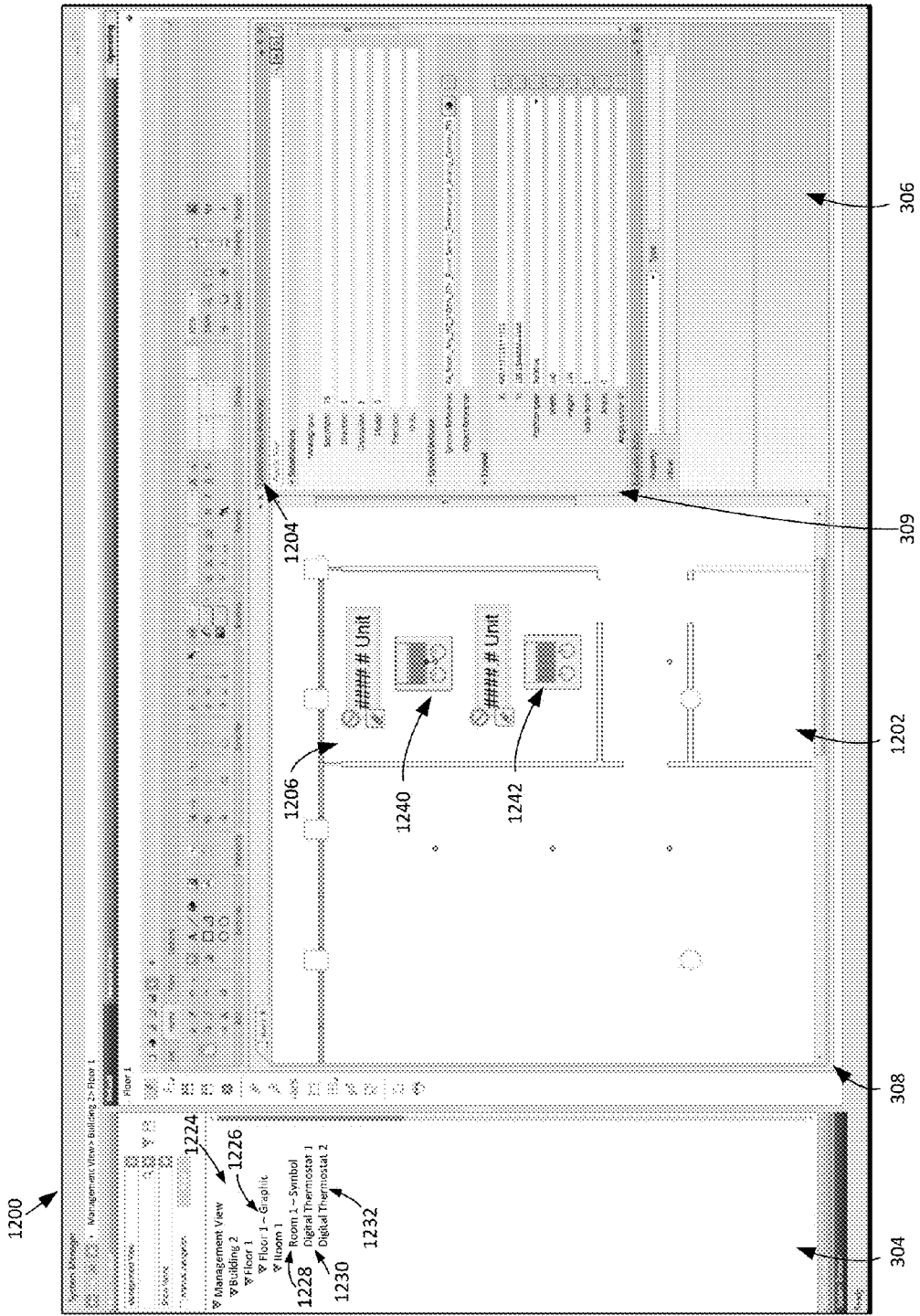
FIG. 12 illustrates an exemplary screen capture of the graphical user interface displaying a building graphic prior to associating a symbol with the building graphic and identifying a property of the symbol for animation in accordance with disclosed embodiments.

The symbol 1112 may correspond to an identified or user selected one of the symbol objects $260_1$-$260_Z$ (e.g., identified by one of the object identifiers 322-332 in FIG. 3 or 1222-1226 in FIG. 12). The symbol 1112 may be an instance of the identified or selected symbol object $260_1$-$260_Z$ that is associated or mapped to a building graphic (e.g., 262, 302 or 1202 in FIG. 12). As explained herein, the symbol 1112 may have comprised one or more symbol elements 1114 that have or correspond to one or more symbol properties 1116. As previously described, the properties (e.g., 1116) of a symbol (e.g., 1112) may be simple, such as a collection of one or more lines or a particular shape (e.g., rectangle, triangle, ellipse etc.). The properties of the symbol may be more complex with varying geometries, gradients, and or fill colors. When these properties are grouped together, the properties form a composite symbol element (e.g., 1114) that may be used to represent one or more objects or devices in the management system 100. A symbol 1112 (or symbol object) may have multiple symbol elements 1114 (e.g., a valve symbol may have a valve stem element and a valve body element among other elements each with one or more properties 1116). However, for clarity in the discussion for the present disclosures for a programmable symbol animation pre-processor for building graphics, the symbol 1112 is described as having or corresponding to a single symbol element having symbol properties 1116, where one symbol property 1116 is mapped as to the property input 1110 for receiving the evaluation result output 1102 of the symbol animation pre-processor 1100 as described herein.

Each symbol property 1116 (which also may be referenced a symbol element display property herein) may have an evaluation type 1118 (e.g., simple, linear, discrete, multi, animated, or other evaluation type) and a corresponding expression (not shown in FIG. 11) that is a pre-defined expression operation as previously described herein. As illustrated in FIG. 11, when a property 1116 of the symbol 1112 is to be animated based on its evaluation type 1118 in accordance with the disclosed embodiments, the data processing system 200 maps the first evaluation result output 1102 of the pre-processor 1100 to the input 1110 of the subsequent expression operation corresponding to the evaluation type 1118 of the symbol 1112 and generates a second evaluation result output 1120 based on the evaluation type 1118 and corresponding expression operation. The data processing system 200 may then display the graphical representation of the symbol based on the second evaluation result output 1120.

The programmable symbol animation pre-processor 1100 as may be employed in a data processing system 200 of the management system 100 is described in further detailed in accordance with the illustrative embodiments depicted in FIGS. 12-19.

Turning to FIG. 12, an exemplary screen capture of the graphical user interface 1200 is shown displaying a building graphic 1202 prior to identifying a property of a symbol associated with the building graphic 1202 for animation in accordance with disclosed embodiments. The graphical user interface 1200 is an example of the graphical user interface 300 in an editor mode. In this illustrative embodiment, the graphical user interface 1200 also comprises a multi-area or multi-pane display window displayed on a display device (e.g., display 211 in FIG. 2). The graphical user interface 1200 includes a display of a building graphic 1202 and a plurality of associated panes or windows 304-309. In this example, the building graphic 1202 is a graphical representation of a floor of a building and is displayed in window 308. A hierarchical structure 1224 of data objects identifiers 1226-1232 is displayed in the pane or window 304 (also referenced as the "system browser" pane or window) of the graphical user interface 300. The data object identifiers 1226-1232 reference data objects corresponding to devices 116, 118 and 120 within the management system 100 and associated building graphics and symbols representing the devices and associated building rooms/spaces identified by the data object identifiers 1226-1232. In the example shown in FIG. 12, the object identifier 1226 ("Floor 1") references the building graphic 1202 (consistent with 262 in FIG. 2) and the object identifier 1228 ("Room 1") references a room symbol (e.g., 1302 in FIG. 13) that may be selectively associated by a user with a space or room 1206 of the building graphic 1202 as further explained herein. The object identifiers 1230 and 1232 (e.g., "Digital Thermostat 1" and "Digital Thermostat 2") reference thermostat building devices that are installed in the building and represented by corresponding building device symbols 1240 and 1242 (or instances of the respective symbol objects) selectively placed in the space or room 1206.

Continuing with FIG. 12, the plurality of associated panes or windows 304-309 includes one or more fields for generating and editing different symbol animations for the building graphic 1202 displayed in a first or primary pane or window 308. In particular, a graphic or symbol properties editor 1204 is displayed in window 309 that enables a user to edit property fields for the building graphic 1202 and/or a symbol selectively associated with the building graphic 1202 (e.g., the room symbol 1302 identified by object identifier 1228 when placed in the space or room 1206 of the building graphic). This is an advantageous feature for tailoring the building graphic 1202 or room symbol (e.g., 1302 corresponding to the object identifier 1228) to be consistent in representing the actual building floor layout. The graphical user interface 1200 further includes an evaluation editor menu 306 to select or edit a property of a selected graphic or symbol for animation in association with the building graphic 1202 and based on the current data point values of one or more devices in the building represented by the building graphic 1202 that are associated with the respective symbol property being animated.

Figure 13:
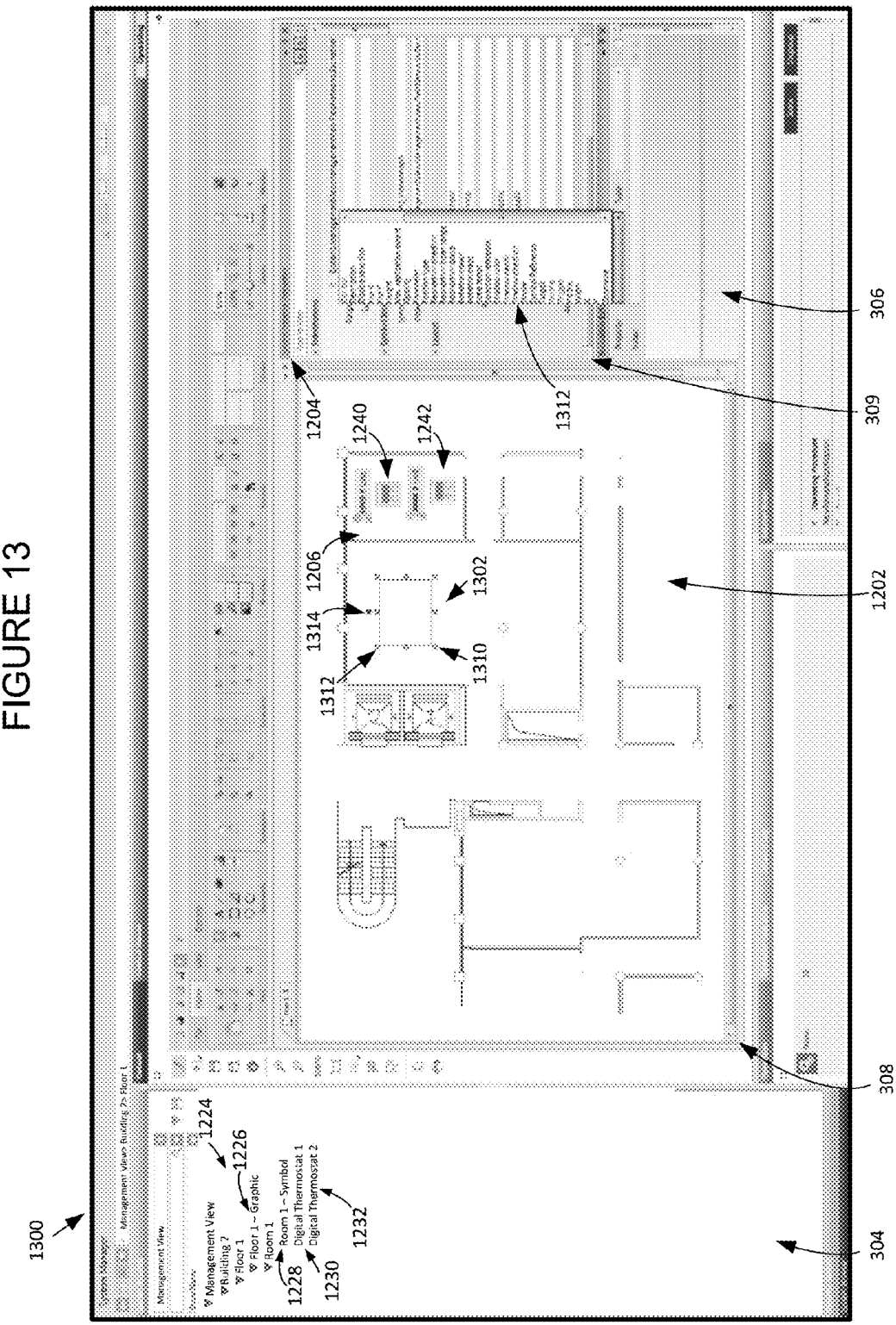
FIG. 13 illustrates an exemplary screen capture of the graphical user interface selectively associating a symbol with the building graphic in accordance with disclosed embodiments, where the graphical user interface has a symbol properties editor menu and an evaluation editor menu.

FIG. 13 is an exemplary screen capture of the graphical user interface 1300 that illustrates selectively associating a symbol with the building graphic in accordance with disclosed embodiments. In this illustrative embodiment, the graphical user interface 1300 is an example of the graphical user interface 300 in an editor mode and consistent with the graphical user interface 1200 in FIG. 12. In the embodiment shown in FIG. 13, the data processing system 200 (e.g., via the processor 202 under the control of the system manager application 228) may receive a user input or request to associate or assign a symbol corresponding to room of the building (e.g., the space or room 1206) represented by the building graphic 1202 by using a mouse (or other pointing device) to select the corresponding object identifier (e.g., object identifier 1228 corresponding to "room 1—symbol") in the system browser pane or window 304 of the graphic user interface 600 and then drag and drop the selected object identifier within the selected space or room 1206 of the building graphic 1202. An instance of the symbol 1302 is then generated by the data processing system 200 (e.g., via the processor 202 under the control of the system manager application 228). Other known input techniques (such as a respective text entry command) can be used to enter a request to generate an instance of a symbol (e.g., a "room 1—symbol 1302) corresponding to an object identifier to be associated with a building graphic (e.g., 1202) for animation based on one or more data points associated with the same or respective devices within the building.

In the embodiment shown in FIG. 13, the symbol graphic 1302 may be initially generated by the data processing system 200 (e.g., via the processor 202 under the control of the system manager application 228) based on default dimensions associated of the symbol 1302 and displayed at a default location on the building graphic 1202. The graphic properties editor 1204 displayed in window 309 enables a user to edit property fields for the symbol 1302. In this embodiment, a user may use a cursor of a mouse (or other pointing device) to select the symbol 1302, drag the symbol 1302 over the desired space or room 1206 and release the mouse to signal to the data processing system 200 via the graphic user interface 1300 to move, orient and fit the symbol 1302 to the dimensions of the space or room 1206. In one embodiment, the dimensions of the space or room may be stored as properties of the building graphic 1202 or provided in a related configuration file (not shown in the figures) associated with the building floor layout represented by the building graphic 1202 that is stored in database 124 or memory 208 for access by data processing system 200 via the system manager application 228. In another embodiment, a user may use a mouse or other pointing device to select and drag graphic manipulation points 1310, 1312 or 1314 to modify or adjust the corresponding dimensions of the symbol 1302 relative to the dimensions of the space or room 1206 of the building graphic 302.

Figure 14:
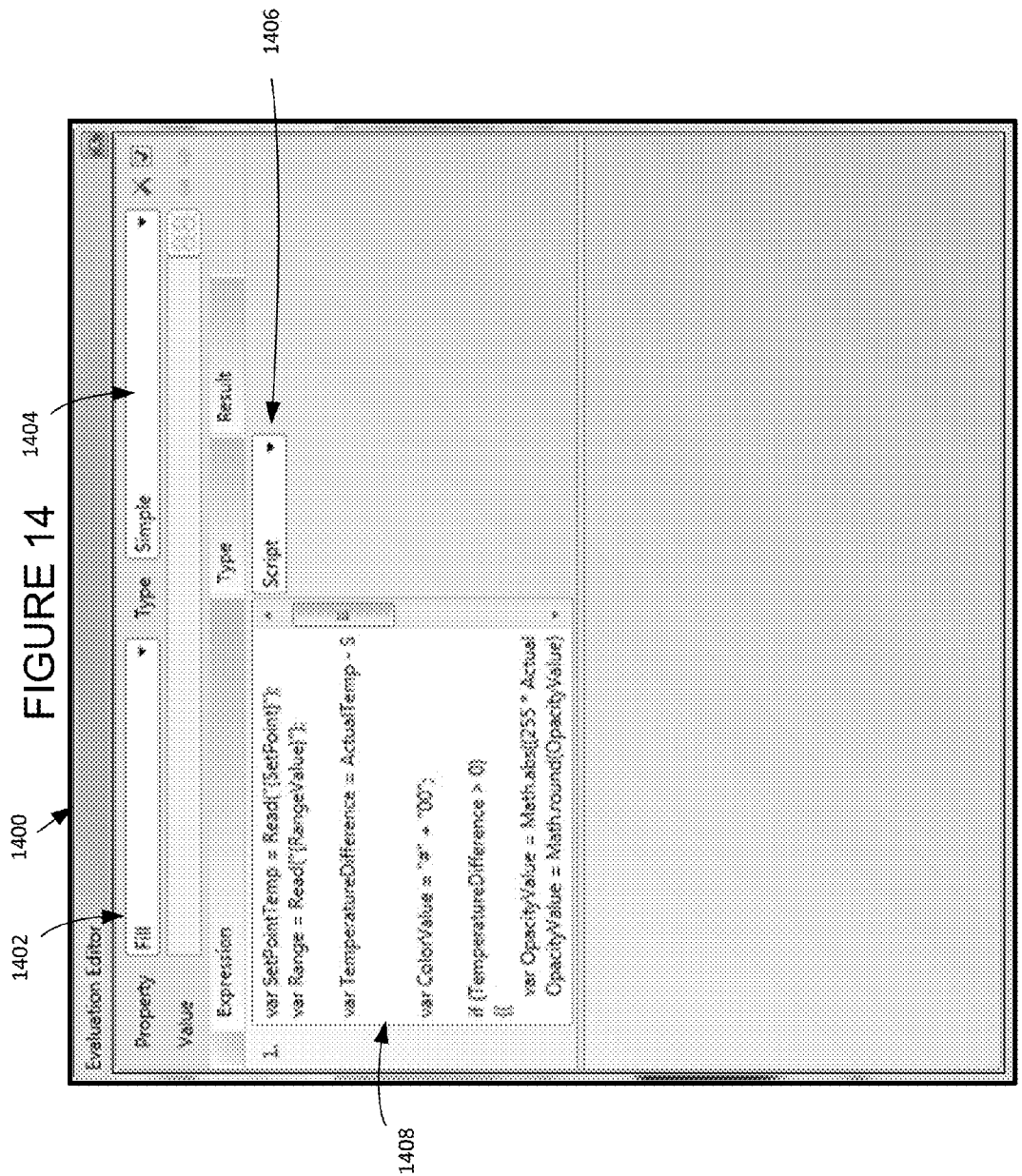
FIG. 14 illustrates an exemplary screen capture of the evaluation editor menu for a simple evaluation type and for defining an expression code script for processing by the symbol animation pre-processor of FIG. 11 in accordance with disclosed embodiments.

Once the symbol 1302 has been generated and associated with the building graphic 1202, a user may use the evaluation editor menu 306 to select or edit a property of a selected graphic or symbol 1302 for animation in association with the building graphic 1202 and based on the current data point values of one or more devices in the building represented by the building graphic 1202 that are associated with the respective symbol property being animated. For example, FIG. 14 illustrates an exemplary screen capture of an evaluation editor menu 1400 for a simple evaluation type and for defining an expression code script for processing by the symbol animation pre-processor 1100 in accordance with disclosed embodiments. The evaluation editor menu 1400 is an example of one implementation of the evaluation editor menu 306 in FIG. 12 where a user may identify to the data processing system 200 a property 1402 of the currently selected symbol (e.g., 1302 in FIG. 13) to be animated based on an evaluation type 1404 and preprocessed based on an associated an expression code script 1406.

As previously described herein the properties (e.g., 1402) of a selected symbol (e.g., 1302) may be simple such as one or more lines or dimensions of the symbol or a particular shape (e.g., rectangle, triangle, ellipse etc.) of the symbol. The properties of the symbol may also be more complex with varying geometries, gradients, and or fill colors. In the example shown in FIG. 14, the user has identified "fill" as the property 1402 of the selected symbol 1302 to be animated based on a "simple" evaluation type 1404.

As shown in FIG. 14, the evaluation editor menu 1400 enables the user to identify an expression type 1406 to the data processing system 200 of either "pre-defined" or "script". When a "pre-defined" expression type is identified, the data processing system 200 uses the pre-defined data point input expression and conditions for the evaluation type identified by the user via the evaluation editor menu as previously described herein. When a "script" expression type is identified via the evaluation editor menu 1400 (as shown in the example in FIG. 14), the data processing system 200 recognizes that the input to the symbol property 1402 (e.g., the "fill" property in FIG. 14) is to be preprocessed via the symbol animation pre-processor 1100 (or instance thereof) based on an expression code script 1108. In the example shown in FIG. 14, the evaluation editor menu 1400 enables a user to identify an expression code script via a corresponding expression code script input field 1408. The expression code script 1408 may be identified in accordance with the embodiments disclosed herein, using ECMA International's scripting language standard specification (e.g., Standard ECMA-262, Edition 5.1, ECMAScript® Language Specification available from ECMA International at http://www.emca-international.org/ecma-262/5.1), a JavaScript scripting language specification, or other scripting languages adapted as described herein.

The data processing system 200 (e.g., via the processor 202 under the control of the system manager application 228) maps the identified expression code script received via the input field 1408 of the evaluation editor menu 1400 to the script input 1106 of the pre-processor 1100 now associated with the property 1402 of the selected symbol 1302 to be animated. The data processing system 200 also maps the first evaluation result output 1102 of the pre-processor 1100 (that corresponds to the result output of the identified expression code script 1408) to the input 1110 of the subsequent expression operation corresponding to the evaluation type 1118 (1404 in FIG. 14) of the selected symbol 1112 (1302 in FIG. 13).

As described in further detail herein (especially in reference to FIGS. 15 and 16), the data processing system 200 parses the identified expression code script 1408 to identify each data point of the one or more building devices 116, 118, or 120 referenced in the script 1408 and maps each identified device data point to a corresponding data point input 1104A-1104N of the pre-processor 1100. For example, as described herein, the data processing system 200, under the control of the system manager application 228 and/or the symbol animation pre-processor, is configured to identify "Read ("{device data point}")" method statements in the identified expression code scripts to identify each device data point to be mapped. When the data processing system 200 is in operating mode, the pre-processor 1100 associated with the property 1402 of the selected symbol 1302 generates a first evaluation result based on the identified device data points as mapped, and the one or more operations identified in the script 1408 that reference and use the identified device data points.

To provide clarity and brevity in the remaining discussion of aspects of the present invention, it is assumed that a user has input the exemplary expression code script 1500 shown in FIG. 15 via the evaluation editor menu 1400 to cause the data processing system 200 using the symbol animation pre-processor 1100 (or instance thereof) to pre-process the identified property 1402 (e.g., "fill") of the selected symbol 1302 (e.g., room symbol 1302 in FIG. 13) for animation of two or more data points associated with one or more building devices (e.g., the "Digital Thermostat 1" device referenced by the object identifier 1230 in FIG. 13) as referenced in the expression code script 1500.

Figure 16:
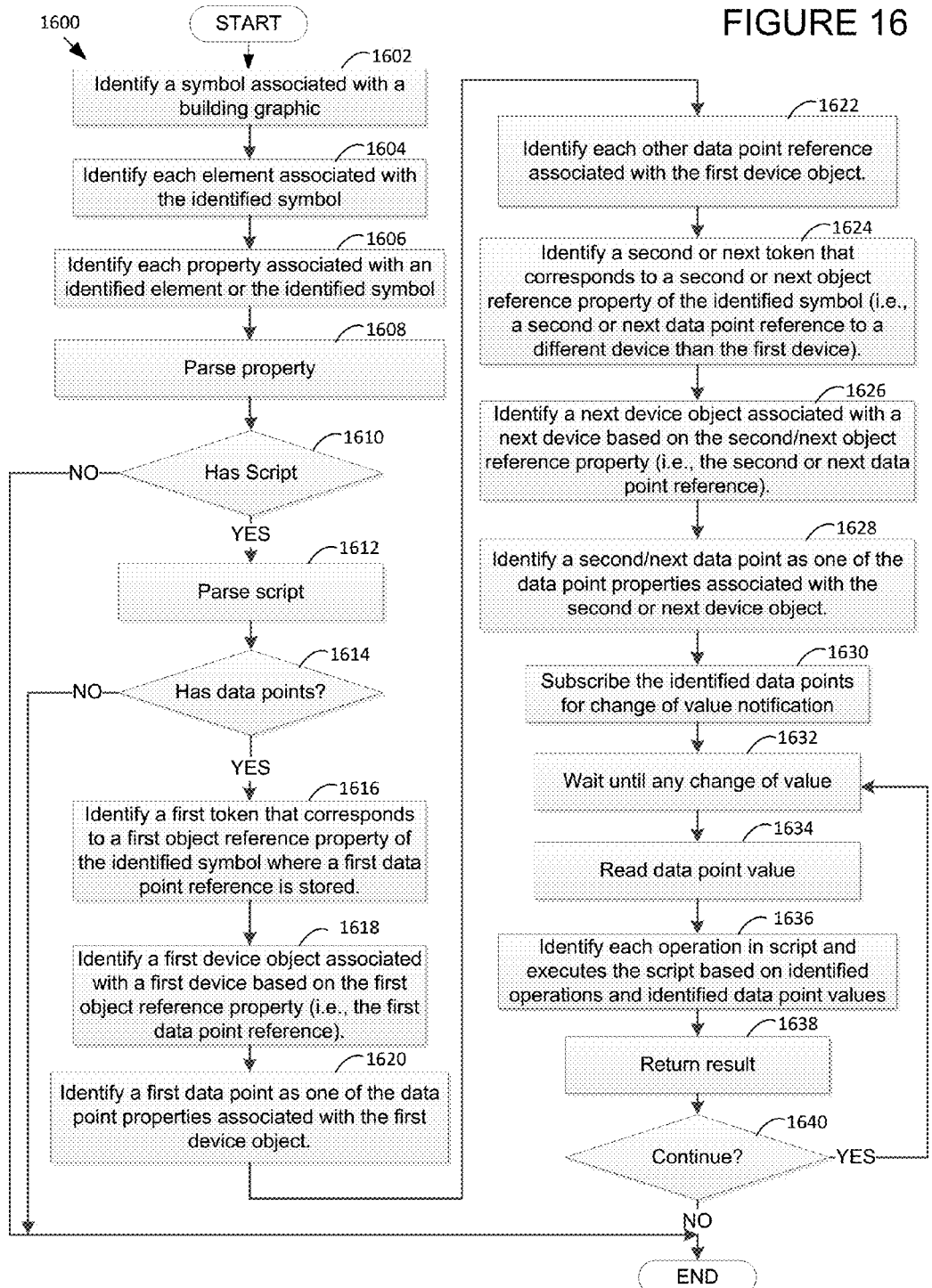
FIG. 16 illustrates a flowchart of a process for displaying symbol animation of a selected evaluation type for animating a property of a symbol based on an output value of the symbol animation pre-processor in FIG. 11 in accordance with disclosed embodiments.
Figure 17:
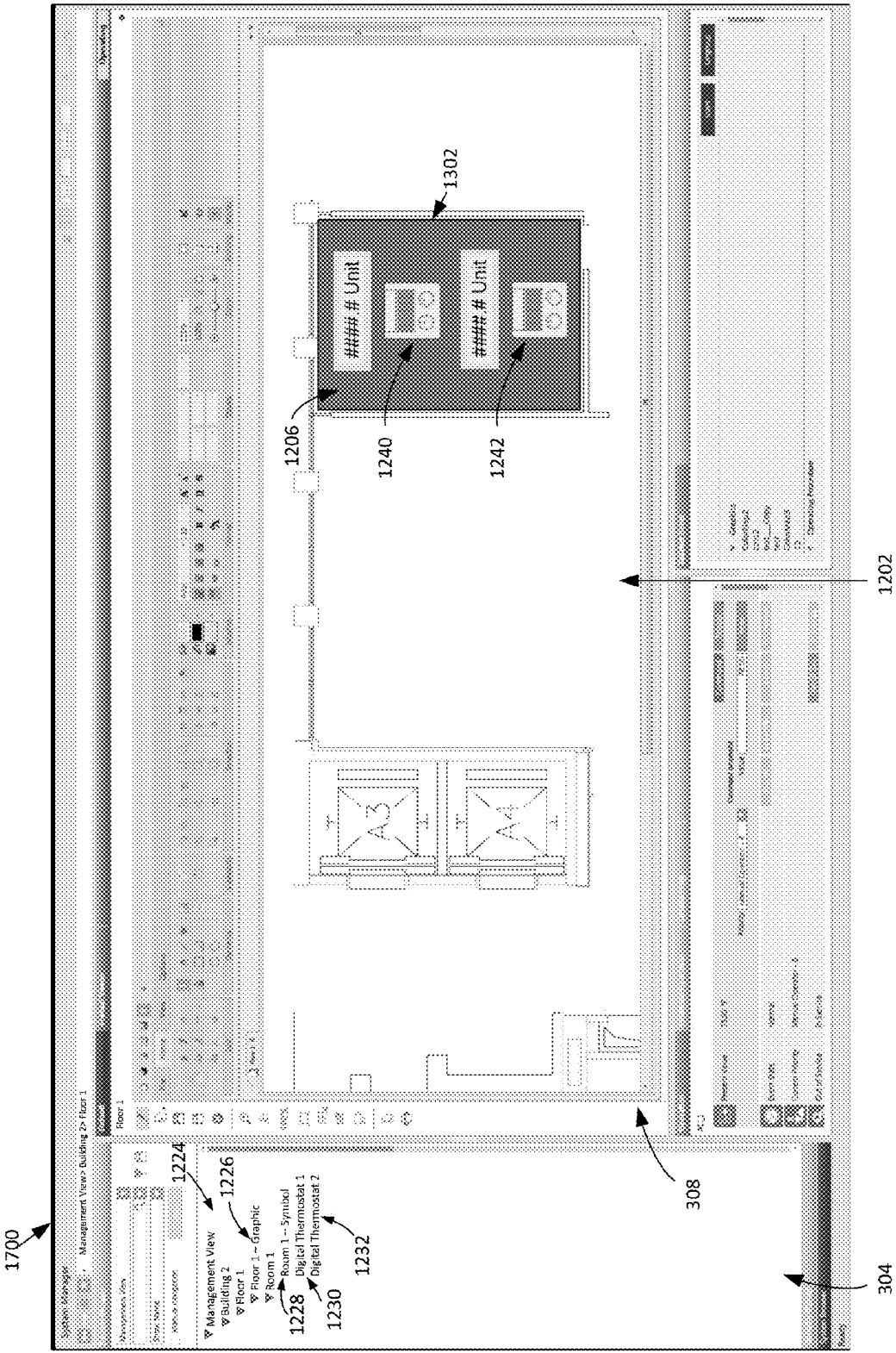
FIG. 17 illustrates an exemplary screen capture of a graphical symbol animation generated using two or more data points processed using the symbol animation pre-processor of FIG. 11 based on the user defined expression code script in FIG. 15 in accordance with disclosed embodiments.
Figure 18:
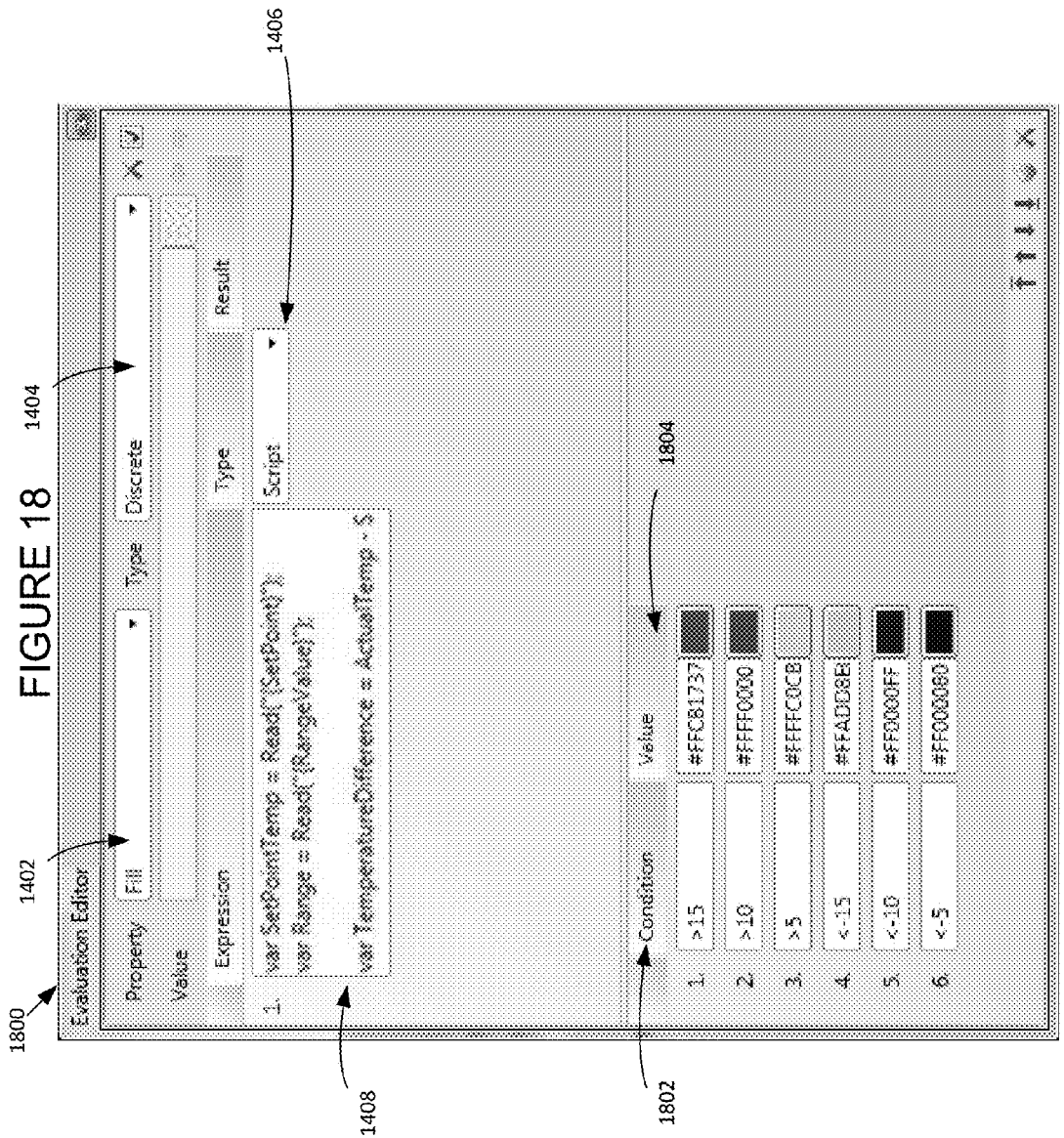
FIG. 18 illustrates another exemplary screen capture of the evaluation editor menu for a discrete evaluation type and for defining an expression code script for processing by the symbol animation pre-processor of FIG. 11 in accordance with disclosed embodiments.

FIG. 16 illustrates a flowchart of a process 1600 that may be performed by the data processing system 200 to display symbol animation of a selected evaluation type (e.g., 1404 in FIG. 14) for animating a property (e.g., 1402) of a symbol (e.g., 1302) based on an output value of the symbol animation pre-processor 1100 in accordance with disclosed embodiments. Although described as being performed by one data processing system 200, the process 1600 may be performed in two or more data processing systems configured to collectively perform acts described below, referred to in the singular as "the system." The process may be implemented by executable instructions stored in a non-transitory computer-readable medium that cause one or more data processing systems to perform such a process. For example, the system manager application 228 may comprise the executable instructions to cause one or more data processing systems and a symbol animation pre-processor to perform this process.

Initially, the system identifies a symbol associated with a building graphic (step 1602). In the embodiment shown in FIG. 13, the system identifies that the "room 1" symbol 1302 (e.g., representing a symbol object instance $260_1$ in FIG. 2) is associated with the area or room 1206 of the building graphic 1202 upon reading the building graphic object 262 represented by the building graphic 1202 to identify each symbol object instance $260_1$-$260_3$ associated with the respective building graphic 1202 (step 1602). The system may also identify a symbol 1302 is the associated with a respective building graphic 1202 in response to a user selectively associating the symbol with the building graphic using drag and drop or other input techniques described herein. Next, the system identifies each element associated with the identified symbol (1604). As previously described in reference to FIG. 11, an identified symbol (e.g., 1112 in FIG. 11) may have comprise one or more symbol elements 1114 that have or correspond to one or more symbol properties 1116. However, to provide clarity to the discussion and avoid obscuring aspects of the present invention, it is assumed that the selected symbol 1302 has only one element (e.g., a rectangle having lines or dimensions approximate to the lines or dimensions of the space or room 1206 of the building graphic 1202).

The system may then identify each property 1116 associated with the identified element of the symbol 1302 or associated with the symbol 1302 itself (1606). The system parses each property 1116 of each identified symbol or symbol element to identify the expression type 1406 associated with the respective property 1116 (e.g., property 1402 in FIG. 14) as well as the evaluation type 1404 that may be specified if the property 1116, 1402 is to be animated (1608). The system then determines whether the property of the identified symbol or symbol element has an associated expression code script (1610). The system may determine the property 1116, 1402 of the identified symbol 1302 has an associated expression code script by determining if the expression type 1406 associated with the property 1116, 1402 is a "script" type rather than a "pre-defined" type. Alternatively, the system may check if an expression code script 1408 has been associated or mapped to the property 1402.

If the system determines that the property of the identified symbol or symbol element does not have an associated expression code script, the system may end process 1600 or return to step/action 1608 to parse another identified property of the identified symbol or symbol element. In response to determining that the property of the identified symbol or symbol element does have an associated expression code script, the system parses the script (1612). While parsing the script or as a result of parsing the script associated with the property of the identified symbol or symbol element, the system determines whether the script has any data point references to data points of building devices 116, 118 and/or 120 (1614). Returning to the example expression code script 1500 shown in FIG. 15 that the system has determined is associated with the "fill" property 1402 of the identified symbol 1302, when the system identifies a "Read ("{device data point}")" method statement 1502, 1504 and 1506 in the identified expression code script 1500, the system recognizes that the script has data point references 1508, 1510, 1512 to data points of one or more building devices 116, 118, and/or 120 in the management system 100. The system is thus able to identify a plurality or group of different data points referenced in the script, where each data point corresponds to the same one or a respective one of the plurality of devices 116, 118 and/or 120 in a building represented by the building graphic 1202 and associated with the symbol having the property to be animated 1302 having the associated script. As further explained in detail herein, when the script 1500 is executed as part of the process 1600, the system identifies a respective value 1514, 1516 and 1518 for each identified data point corresponding to the identified data point references 1508, 1510, 1512, where each value 1514, 1516 and 1518 is received from the management system 100 operably connected to each of the respective building devices 116, 118 and 120 directly or indirectly via corresponding building device objects 250A-250N (e.g., as shown in FIG. 2).

Continuing with FIG. 16, the system may also identify a first token in the script that corresponds to a first object reference property of the identified symbol from among the properties 1116 of the identified symbol where a first data point reference is stored (1616). For example, in the embodiment of the expression code script 1500 depicted in FIG. 15, when parsing the script 1500, the system recognizes that the "Read ("{device data point}")" method statement 1502 specifies a "*" as the data point reference 1508. Upon identifying this first token ("*"), the system then retrieves the data point reference stored as the first object reference property of the identified symbol. In one embodiment, the method step or action 1616 may be performed as part of the method step or action 1614 of determining whether the script has any data point references to data points of building devices 116, 118 and/or 120 and identifying the plurality or group of different data points referenced in the script.

The system then identifies a first device object (e.g., 250A) associated with a first of the devices 116, 118 or 120 based on (or using the data point reference stored at) the first object reference property of the symbol properties 1116 corresponding to the first token (1618). Continuing with the example depicted in FIG. 15 for the script 1500 associated with the property 1402 of the selected "room 1" symbol 1302, the "room 1" symbol 1302 may have a first object reference property (e.g., one of the properties 1116) that is a data point reference corresponding to the object identifier 1230 in FIG. 13 for the "Digital Thermostat 1" device object (e.g., 250A). In this example, the system then is able to identify the "Digital Thermostat 1" device object 250A as the first device object associated with the corresponding "Digital Thermostat 1" device installed in space or room 1206 of the building represented by building graphic 1202 and that is associated with selected "room 1" symbol 1302 as positioned relative to the building graphic 1202.

Returning to FIG. 16, the system is then able to identify a first of the previously identified data points corresponding to the data point references 1508, 1510 and 1512 in the expression code script 1500 (associated with the property 1402 of the selected symbol 1302) as one of the data point properties (e.g., "ActualTemp" 1514) of the identified first device object (e.g., "Digital Thermostat 1" device object 250A). In particular, with respect to the example shown in FIG. 5, the system is able to identify the actual sensed temperature property or data point value (represented as "ActualTemp" 1514 in FIG. 15) of the identified "Digital Thermostat 1" device object 250A as the first identified data point referenced in the script 1500 based on the identification of the token "*" in the "Read ("{device data point}")" method statement 1502.

As further explained herein, the system receives or retrieves a current value of previously identified data point (e.g., the value of "ActualTemp" 1514) from the corresponding property of the identified device object (e.g., the actual sensed temperature property of the "Digital Thermostat 1" device object 250A) as received from the associated building device (e.g., "Digital Thermostat 1" device 116) via the management system 100. The system then uses the received or retrieved current value of the previously identified data point when executing an operation identified in the expression code script 1500 that references the identified data point.

After identifying the first data point or data point reference 1508, the system identifies each other data point or data point reference 1510 and 1512 that is associated with the same first device object (e.g., "Digital Thermostat 1" device object 250A) (1622). In the example shown in FIG. 15, the system identifies the "SetPoint" data point reference 1510 and the "RangeValue" data point reference 1512 upon processing the corresponding "Read ("{device data point}")" method statements 1504 and 1506 as properties of the same device object (e.g., "Digital Thermostat 1" device object 250A).

When parsing the expression code script 1500 associated with the property 1402 of the symbol 1302 to be animated, the system may identify a second or next token ("*" or different token) that corresponds to a second or next object reference property of the identified symbol (i.e., a second or next data point reference to a different device than the first device) (1624), identify a next device object (e.g., 250B) associated with a next device (e.g., 118 or 120) based on the second or next object reference property (i.e., the second or next data point reference) (1626), and then identify a second or next data point as one of the data point properties associated with the identified second or next device object (e.g., 250B) (1628). Although not shown in FIG. 15, upon identifying another "Read ("{device data point}")" method statement that specified a second or next token (e.g., "*" or different token), the system would use the second or next token to retrieve the corresponding second or next data point reference (e.g., ActualTemp of "Digital Thermostat 2") stored at a corresponding second or next object reference property of the selected symbol 1302. In this manner, when parsing the Read ("{device data point}")" method statements in the identified expression code script 1500 associated with the property 1402 of the selected symbol 1302, the system is able to identify multiple data points or data point references 1502, 1504 and 1506 associated with the same device object 250A or with different device objects 250A and 250B.

Continuing with FIG. 16, the system next subscribes each of the identified data points or data point references 1502, 1504 and 1506 of the identified device objects 250A, 250B for change of value notification (1630). In one embodiment, the system may subscribe a data point by setting a change of value (COV) flag that is another property of the identified device object 250A or 250B, so that the system only receives or retrieves a value for a data point of an identified device object 250A or 250B when the management system 100 sends a corresponding change of value notice to the system.

In this manner, the system may then wait until any change of value notice is received (1632) before reading or receiving a value of a corresponding one or all of the data points the system identified in the script 1500 (1634), (e.g., receiving or retrieving a value of ActualTemp 1514, SetPointTemp 1516 and/or Range 1518 corresponding to the data point references 1508, 1510 and 1512).

In the action or step 1636, the system also identifies each operation 1520-1550 in the script 1500 (in addition to the "Read ("{device data point}")" method statement operations 1502, 1504 and 1506) and executes the script 1500 based on the identified operations 1520-1550 and the identified data point values (e.g., ActualTemp 1514, SetPointTemp 1516 and/or Range 1518 corresponding to the data point references 1508, 1510 and 1512).

In response to executing the script 1500, the system returns the result 1552 as the first evaluation result output 1102 of the pre-processor 1100 (1638). As previously described in detail herein, the first evaluation result output 1102 of the pre-processor 1100 is mapped by the system to the input 1110 of the subsequent expression operation corresponding to the evaluation type 1118 (1404 in FIG. 14) of the property 1116 (1402 in FIG. 14) of the selected symbol 1112, 1302 to be animated. When the property 1116,1402 of the symbol 1112, 1302 is to be animated based on its evaluation type 1118, 1404 in accordance with the disclosed embodiments (after mapping the first evaluation result output 1102 of the pre-processor 1100 to the input 1110 of the subsequent expression operation corresponding to the evaluation type 1118, 1404 of the symbol 1112), the data processing system 200 generates a second evaluation result output 1120 based on the evaluation type 1118, 1404 and corresponding expression operation. The data processing system 200 may then display the graphical representation of the symbol based on the second evaluation result output 1120. In the example shown in FIG. 14, the "fill" property 1402 of the selected symbol 1302 has a "simple" evaluation type 1404, which is mapped as is without any further subsequent expression operation or condition to the second evaluation result output 1120 for use in animating the "fill" property of the selected symbol 1302. However, the selected symbol 1302 may have another have an evaluation type 1118 other than "simple" evaluation type (e.g., linear, discrete, multi, animated, or other evaluation type) and a corresponding subsequent expression that is a pre-defined expression operation as previously described herein that uses the first evaluation result output 1102 of the symbol animation pre-processor 1100 as the data point input 1110 for the subsequent expression operation to be performed in accordance with the evaluation type (e.g., linear, discrete, multi, animated, or other evaluation type) for use in animating the property of the selected symbol 1302 to be animated.

Returning to FIG. 16, the system next determines whether to continue using the symbol animation pre-processor 1100 to generate a first evaluation result for the identified symbol property 1402 to be animated. If a user does not specify a change or stop condition (e.g., via the graphical user interface 302), the system may continue processing at the action or step 1623 to await another change of value of any one of the data points identified in the script 1500 associated with the symbol property 1402 to be animated. Otherwise, the system ends the process 1600.

In the example shown in FIG. 1500, by employing the symbol animation pre-processor 1100 to perform the process 1600, the system is able to identify and receive change of values of the actual sensed temperature data point value ("ActualTemp" 1514), the set point temperature data point value ("SetPointTemp" 1516) and the temperature threshold range ("Range" 1518) from the device object 250A associated with the "Digital Thermostat 1" device 116 associated with the "fill" property of the selected "room 1" symbol 1302. By performing operation 1520, the system identifies a current temperature difference ("TemperatureDifference") based on the difference between the actual sensed temperature data point value ("ActualTemp" 1514) and the set point temperature data point value ("SetPointTemp" 1516). By performing operation 1522, the system initializes a color value result 1522 that may be used by the system for animating the associated "fill" property 1402 of the selected "room 1" symbol 1302. By performing the operation 1524, the system determines if the identified "TemperatureDifference" exceeds "3" degrees. If the "TemperatureDifference" exceeds "3" degrees, the system performs the operations 1526-1536 to identify an "OpacityValue" based on the "ActualTemp" 1514 divided over the identified temperature threshold range "Range" 1518 and using the "OpacityValue" to lighten or darken a "red" base color that is then assigned to the "ColorValue" result 1552 to produce a corresponding color fill animation change in the selected "room 1" symbol 1302 as shown in the screen shot of the Graphical User Interface 1700 in FIG. 17 to reflect the warming of the space or room 1206 sensed by the "Digital Thermostat 1" device. Note: Graphical User Interface 1700 is consistent with Interfaces 302 and 1200.

Alternatively, if the "TemperatureDifference" is less than "3" degrees as determined from performing the operation 1538, the system performs the operations 1540-1550 to identify an "OpacityValue" based on the identified temperature threshold range "Range" minus the "ActualTemp" 1514 divided over the identified temperature threshold range "Range" 1518 and using this "OpacityValue" to lighten or darken a "blue" base color that is then assigned to the "ColorValue" result 1552 to produce a corresponding color fill animation change in the selected "room 1" symbol 1302 (not shown in Figures) to reflect the cooling of the space or room 1206 sensed by the "Digital Thermostat 1" device.

As previously noted, in the example shown in FIG. 14, the "fill" property 1402 of the selected symbol 1302 has a "simple" evaluation type 1404, which is mapped as is without any further subsequent expression operation or condition to the second evaluation result output 1120 for use in animating the "fill" property of the selected symbol 1302. However, the selected symbol 1302 may have another have an evaluation type 1118 other than "simple" evaluation type such as a "discrete" evaluation type as shown in the embodiment illustrated in FIG. 18 of the evaluation editor menu 1800. In this illustrative embodiment, the evaluation editor menu 1800 is an example of one implementation of the evaluation editor menu 306 that is consistent with the evaluation editor editor 1400 in Figure, except the evaluation type 1404 is identified as "discrete".

In this illustrative embodiment, the data processing system 200 first pre-processes the expression code script 1408 (or 1500) to generate the first evaluation result output 1102 of the symbol animation pre-processor 1100 as the data point input 1110 for the selected "room 1" symbol 1302 as previously described. However, since the evaluation type 1404 is "discrete", the system performs the subsequent expression operation based on the pre-defined conditions 1802 and corresponding substitution variables 1804 based on the first evaluation result output 1102 of the symbol animation pre-processor 1100 in order to identify which "fill" color to animate the associated "room 1" symbol. In the example shown in FIG. 18, this use of discrete evaluation types may be particularly advantageous where a user desires to be notified when multiple "Digital Thermostat" data point values are first pre-processed to generate the first evaluation result based on the script 1408 (or 1500) specified by the user and the first evaluation result points on the extreme ends of acceptable values.

Other data points and operations may be identified in a script for pre-processing to generate a first evaluation result for a symbol property 1402 to be animated. For example, the expression code script 1408 or 1500 may have two "Read ("{device data point}")" method statement that specified a first and second tokens (e.g., "*" or different token) respectfully, which the system would use to retrieve the corresponding first data point reference (e.g., ActualTemp of "Digital Thermostat 1") stored at a corresponding first object reference property of the selected "room 1" symbol 1302 and second data point reference (e.g., ActualTemp of "Digital Thermostat 2") stored at a corresponding second object reference property of the selected "room 1" symbol 1302. The identified expression code script 1408 or 1500 may also include an averaging operation based on the values of the first data point reference and the second data point reference received from the corresponding "Digital Thermostat 1" device and the "Digital Thermostat 2" device, which the system may then use to generate the first evaluation result for pre-processing the animation of the "fill" color property of the "room 1" symbol 1302 as described herein.

Disclosed embodiments provide display and animation of graphical symbols for conveying information and alerts regarding a status of devices in one or more buildings. Various embodiments provide substitutions for the graphical symbols to provide different types of information about a same device. Various embodiments include different types of evaluations for presenting information about devices in different and customizable manners. In addition, embodiments described herein provide displaying graphical symbol animation with evaluations for building automation graphics using a programmable symbol animation pre-processor to enable multi-data points from the same or respective building devices to be employed in the symbol animation to reflect information and alerts regarding the status of multiple building device data points.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

In addition, the steps of various methods or processes described in connection with the embodiments disclosed herein may be embodied directly in hardware, in instructions executed by a processor (e.g., processor 202 and pre-processor 270 of the data processing system 200), or in a combination of the two. Instructions to be executed by a processor may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method comprising:
   identifying a symbol associated with a building graphic that represents a physical building or portion thereof;
   identifying a property of the symbol to be animated;
   providing a user specified option to set an expression type for the identified symbol property as "script" or "pre-defined";
   determining whether the identified symbol property has the expression type set to "script" or to "pre-defined";
   in response to determining that the identified symbol property has the expressing type set to "script";
      identifying different data points referenced in a user-input script, each data point corresponding to a specific building device in the physical building represented by the building graphic and the user-input script provided by a user of data processing system in connection with setting the expression type of the identified symbol property to "script";
      identifying a respective value for each identified data point, each value received from a management system operably connected to the specific building device;
      identifying an operation in the user-input script that corresponds to an evaluation of the values of the identified data points;
      generating a script-based evaluation result by performing the operation identified in the user-input script; and
      displaying a graphical representation of the symbol based on the script-based evaluation result and in association with the building graphic; and
   in response to determining that the identified symbol property has the expression type set to "pre-defined":
      identifying a pre-defined operation corresponding to the identified symbol property;
      identifying different data points referenced in the pre-defined operation;
      receiving a respective value for each identified data point via the management system;
      generating a pre-defined-based evaluation result by performing the pre-defined operation; and
      displaying a graphical representation of the symbol based on the pre-defined-based evaluation result and in association with the building graphic.

2. The method of claim 1, further comprising:
   re-generating the script-based evaluation result based on a change in the value of any one of the identified data points received from the management system and in accordance with the identified operation;
   providing the re-generated script-based evaluation result as an input into a second operation corresponding to a second evaluation;
   generating a second evaluation result by performing the second operation with the re-generated script-based evaluation result as an input; and
   modifying the graphical representation of the symbol based on the re-generated script-based evaluation result.

3. The method of claim 1, wherein a first of the identified data points corresponds to one of an input and an output of a first device in the physical building and a second of the identified data points corresponds to another of the input and the output of the first device.

4. The method of claim 3, wherein identifying the different data points referenced in the script comprises:
   identifying a first token in the user-input script that corresponds to a first object reference property of the symbol;
   identifying a first device object associated with the first device based on the first object reference property corresponding to the first token; and
   identifying the first of the identified data points a data point property of the identified first device object.

5. The method of claim 4, wherein identifying the different data points referenced in the user-input script further comprises:
   identifying a data point reference in the script; and
   identifying the second of the identified data points as another data point property of the identified first device object corresponding to the data point reference.

6. The method of claim 1, wherein a first of the identified data points corresponds to a first device in the physical building and a second of the identified data points corresponds to a second device in the physical building.

7. The method of claim 6, wherein identifying the different data points referenced in the script comprises:
   identifying a first token in the user-input script that corresponds to a first object reference property of the symbol;
   identifying a first device object associated with the first device based on the first object reference property corresponding to the first token;
   identifying the first of the identified data points as a data point property of the identified first device object;
   identifying a second token in the script that corresponds to a second object reference property of the symbol;
   identifying a second device object associated with the second device based on the second object reference property corresponding to the second token; and
   identifying the second of the identified data points as a data point property of the identified second device object.

8. A data processing system comprising:
   a memory storing a building graphic that represents a physical building or portion thereof;

a network interface that connects to a management system operably connected to a plurality of devices in the physical building represented by the building graphic;
a display device; and
a processor coupled to the memory, the network interface and the display device, where the processor is configured to execute instructions to:
identify a symbol associated with the building graphic;
identify a property of the symbol to be animated;
provide a user specified option to set an expression type for the identified symbol property as "script" or "pre-defined";
determine whether the identified symbol property has the expression type set to "script" or to "pre-defined";
in response to determining that the identified symbol property has the expression type set to "script":
identify different data points referenced in a user-input script for the identified symbol property, each identified data point corresponding to a specific building device in the physical building represented by the building graphic and the user-input script provided by a user of data processing system in connection with setting the expression type of the identified symbol property to "script";
receive a respective value for each identified data point via the management system when connected to the network interface;
identify an operation in the user-input script that corresponds to an evaluation of the values of the identified data points;
generate a script-based evaluation result by performing the operation identified in the user-input script; and
display via the display device a graphical representation of the symbol based on the script-based evaluation result and in association with the building graphic; and
in response to determining that the identified symbol property has the expression type set to "pre-defined":
identify a pre-defined operation corresponding to the identified symbol property;
identify different data points referenced in the pre-defined operation;
receive a respective value for each identified data point via the management system when connected to the network interface;
generate a pre-defined-based evaluation result by performing the pre-defined operation; and
display via the display device a graphical representation of the symbol based on the pre-defined-based evaluation result and in association with the building graphic.

9. The data processing system of claim 8, wherein the processor is configured to execute the instructions further to:
re-generate the script-based evaluation result or the pre-defined-based evaluation result based on a change in the value of any one of the identified data points received from the management system and in accordance with the identified operation; and
modify the graphical representation of the symbol based on the re-generated script-based evaluation result or the re-generated pre-defined-based evaluation result.

10. The data processing system of claim 8, wherein a first of the identified data points corresponds to one of an input and an output of a first device in the physical building and a second of the identified data points corresponds to another of the input and the output of the first device.

11. The data processing system of claim 10, wherein the processor is configured to execute the instructions to identify different data points referenced in the user-input script by:
identifying a first token in the script that corresponds to a first object reference property of the symbol;
identifying a first device object associated with the first device based on the first object reference property corresponding to the first token; and
identifying the first of the identified data points as one of the data point properties of the identified first device object.

12. The data processing system of claim 11, wherein the processor is configured to execute the instructions to identify the different data points referenced in the user-input script further by:
identifying a data point reference in the user-input script; and
identifying the second of the identified data points as another of the data point properties of the identified first device object corresponding to the data point reference.

13. The data processing system of claim 8, wherein a first of the identified data points corresponds to a first device in the physical building and a second of the identified data points corresponds to a second device in the physical building.

14. The data processing system of claim 13, wherein the processor is configured to execute the instructions to identify the different data points referenced in the user-input script by:
identifying a first token in the script that corresponds to a first object reference property of the symbol;
identifying a first device object associated with the first device based on the first object reference property corresponding to the first token;
identifying the first of the identified data points as one of the data point properties of the identified first device object;
identifying a second token in the script that corresponds to a second object reference property of the symbol;
identifying a second device object associated with the second device based on the second object reference property corresponding to the second token; and
identifying the second of the identified data points as one of the data point properties of the identified second device object.

15. A non-transitory computer-readable medium encoded with executable instructions that, when executed, cause one or more data processing systems to:
identify a symbol associated with a building graphic that represents a physical building or portion thereof;
identify a property of the symbol to be animated;
provide a user specified option to set an expression type for the identified symbol property as "script" or "pre-defined";
determine whether the identified symbol property has the expression type set to "script"-or to "pre-defined";
in response to determining that the identified symbol property has the expression type set to "script":
identify different data points referenced in a user-input script, each data point corresponding to a specific build device in the physical building represented by the building graphic and the user-input script provided by a user of data processing system in connection with setting the expression type of the identified symbol property to "script";

identify a respective value for each identified data point, each value received from a management system operably connected to the specific building device;

identify an operation in the user-input script that corresponds to an evaluation of the values of the identified data points;

generate a script-based evaluation result by performing the operation identified in the user-input script;

display a graphical representation of the symbol based on the script-based evaluation result and in association with the building graphic; and in response to determining that the identified symbol property has the expression type set to "pre-defined":

identify a pre-defined operation corresponding to the identified symbol property;

identify different data points referenced in the pre-defined operation;

receive a respective value for each identified data point from the management system operable connected to the specific building device;

generate a pre-defined-based evaluation result by performing the pre-defined operation; and display a graphical representation of the symbol based on the pre-defined-based evaluation result and in association with the building graphic.

16. The computer-readable medium of claim 15, wherein the computer-readable medium is further encoded with executable instructions that, when executed, cause one or more data processing systems to:

re-generate the script-based evaluation result based on a change in the value of any one of the identified data points received from the management system and in accordance with the identified operation;

provide the re-generated script-based evaluation result as an input into a second operation corresponding to a second evaluation;

generate a subsequent evaluation result by performing the second operation with the re-generated script-based evaluation result as an input; and modify the graphical representation of the symbol based on the subsequent evaluation result.

17. The computer-readable medium of claim 15, wherein a first of the identified data points corresponds to one of an input and an output of a first device in the physical building and a second of the identified data points corresponds to another of the input and the output of the first device, and wherein the instructions that cause the one or more data processing systems to identify the different data points referenced in the user-input script comprise instructions that cause the one or more data processing systems to:

identify a first token in the user-input script that corresponds to a first object reference property of the symbol;

identify a first device object associated with the first device based on the first object reference property corresponding to the first token; and identify the first of the identified data points as a data point property of the identified first device object.

18. The computer-readable medium of claim 15, wherein a first of the identified data points corresponds to a first device in the physical building and a second of the identified data points corresponds to a second device in the physical building, and wherein the instructions that cause the one or more data processing systems to identify the different data points referenced in the user-input script comprise instructions that cause the one or more data processing systems to:

identify a first token in the user-input script that corresponds to a first object reference property of the symbol;

identify a first device object associated with the first device based on the first object reference property corresponding to the first token;

identify the first of the identified data points as a data point property of the identified first device object;

identify a second token in the script that corresponds to a second object reference property of the symbol;

identify a second device object associated with the second device based on the second object reference property corresponding to the second token; and identify the second of the identified data points as a data point property of the identified second device object.

19. The computer-readable medium of claim 16, wherein the second operation, to which the re-generated script-based evaluation result is provided as an input, is a pre-defined operation.

* * * * *